United States Patent
Muguruma et al.

(10) Patent No.: US 7,693,173 B2
(45) Date of Patent: Apr. 6, 2010

(54) COMMUNICATION SYSTEM, COMMUNICATION CONTROL METHOD, COMMUNICATION CONTROL APPARATUS, AND COMMUNICATION CONTROL PROGRAM

(75) Inventors: Naoyuki Muguruma, Saijo (JP); Hiroaki Sato, Saijo (JP)

(73) Assignee: Panasonic Corporation, Osaka (JP)

( * ) Notice: Subject to any disclaimer, the term of this patent is extended or adjusted under 35 U.S.C. 154(b) by 1174 days.

(21) Appl. No.: 11/281,530

(22) Filed: Nov. 18, 2005

(65) Prior Publication Data
US 2006/0146887 A1    Jul. 6, 2006

(30) Foreign Application Priority Data
Nov. 19, 2004  (JP)  .............. 2004-336440
May 25, 2005   (JP)  .............. 2005-153143

(51) Int. Cl.
H04L 12/413   (2006.01)
H04L 12/43    (2006.01)
H04J 3/06     (2006.01)

(52) U.S. Cl. .................. 370/445; 370/458; 370/503
(58) Field of Classification Search .......... 370/431, 370/445, 458–459, 442–443, 503, 516
See application file for complete search history.

(56) References Cited

U.S. PATENT DOCUMENTS

2004/0170135 A1    9/2004  Sugaya
2005/0058151 A1*   3/2005  Yeh ........................ 370/445

FOREIGN PATENT DOCUMENTS

JP    2002-353975    12/2002
JP    2004-215073     7/2004

OTHER PUBLICATIONS

Wireless LAN Medium Access Control and Physical Layer Specification IEEE Std 802.11, Aug. 1999 (pp. 70-97).

\* cited by examiner

Primary Examiner—Kevin C Harper
(74) Attorney, Agent, or Firm—Wenderoth, Lind & Ponack, L.L.P.

(57) ABSTRACT

Each terminal is provided with a time sync unit for performing a process of establishing with a destination terminal, using time sync information for establishing time synchronization relating to an access timing to a communication medium, and a communication monitor unit for monitoring time sync information in communication between other terminals, wherein the time sync information in communication between other terminals, which is obtained by the communication monitor unit, is transmitted to a terminal which is different from the other terminals and establishes no time synchronization.

25 Claims, 17 Drawing Sheets

Fig.3 (a) 310 sync communication request packet

| destination terminal ID | source terminal ID | time sync period | slot time | offset | slot number | reservation | packet type |
|---|---|---|---|---|---|---|---|
| 301 | 302 | 303 | 304 | 305 | 306 | 307 | 309 |
| 2 bytes | 6 bytes | 6 bytes | 2 bytes | 2 bytes | 2 bytes | 2 bytes | 2 bytes |

Fig.3 (b) 320 sync communication response packet

| destination terminal ID | source terminal ID | time sync period | slot time | offset | slot number | status | packet type |
|---|---|---|---|---|---|---|---| time sync information (covers time sync period, slot time, offset, slot number)

|  | self-terminal use slot | other-terminal use slot |
|---|---|---|
| terminal E | — | — |
| terminal F | — | — |
| terminal G | — | — |
| terminal H | — | — |

Fig.14 (b)

|  | self-terminal use slot | other-terminal use slot |
|---|---|---|
| terminal E | 1 | — |
| terminal F | 1 | — |
| terminal G | — | — |
| terminal H | — | — |

Fig.14 (c)

|  | self-terminal use slot | other-terminal use slot |
|---|---|---|
| terminal E | — | — |
| terminal F | 1 | — |
| terminal G | — | — |
| terminal H | — | — |

Fig.14 (d)

|  | self-terminal use slot | other-terminal use slot |
|---|---|---|
| terminal E | 1 | — |
| terminal F | 1 | — |
| terminal G | — | — |
| terminal H | — | — |

Fig.14 (e)

|  | self-terminal use slot | other-terminal use slot |
|---|---|---|
| terminal E | 1 | — |
| terminal F | 1 | — |
| terminal G | — | 1 |
| terminal H | — | — |

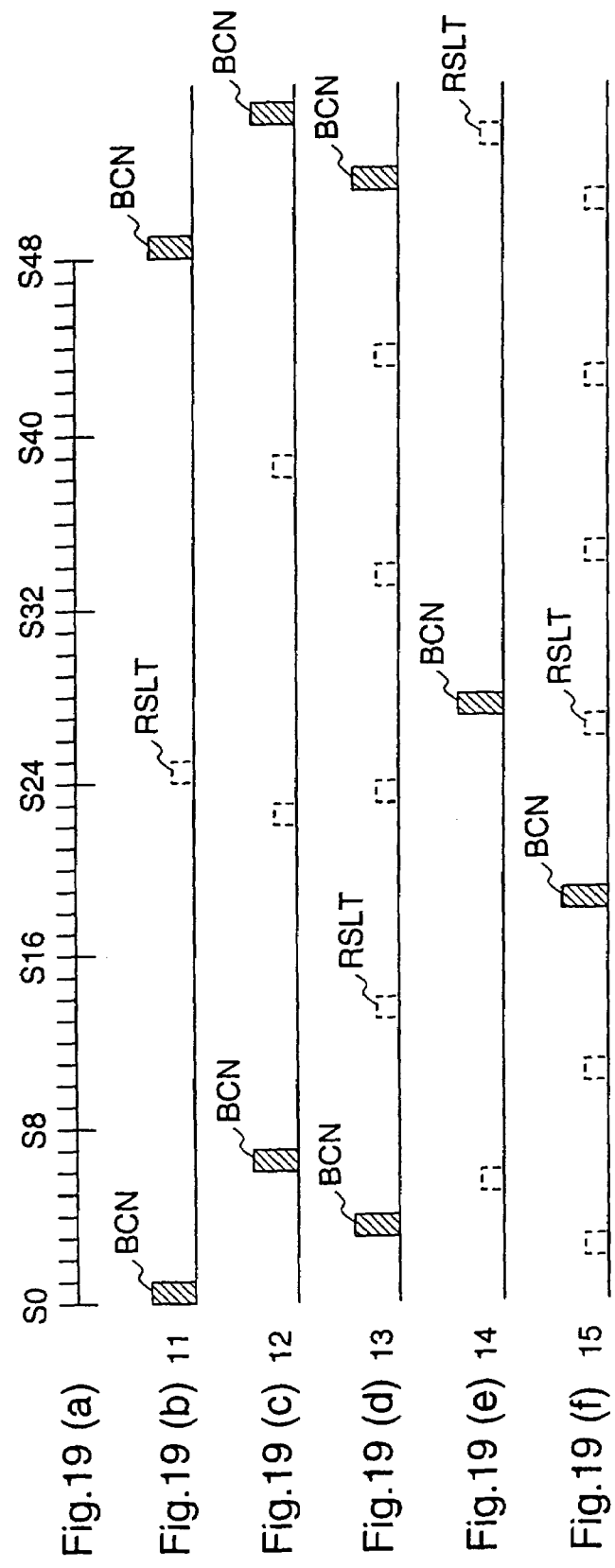

COMMUNICATION SYSTEM, COMMUNICATION CONTROL METHOD, COMMUNICATION CONTROL APPARATUS, AND COMMUNICATION CONTROL PROGRAM

FIELD OF THE INVENTION

The present invention relates to a communication system, a communication control method, a communication control apparatus, and a communication control program, and more particularly, to establishment of synchronization among plural terminals and communication control for synchronized data, in a communication network in which no control station exists or a control station does not perform access control to a communication medium.

BACKGROUND OF THE INVENTION

Generally, when performing data communication with a communication medium being shared among plural terminal stations, each terminal station carrier-senses the communication medium prior to data packet transmission, refrains from transmitting a data packet when it determines that the communication medium is being used (channel busy), and transmits a data packet when it determines that the communication medium is not used (channel idle). This access control method is called CSMA (Carrier Sense Multiple Access). This method is used for a wireless LAN (Local Area Network) or a power line communication system.

Among the plural terminal stations performing data communication, there might be cases where a signal transmitted from one terminal station cannot be directly received by another terminal station, for example, two terminal stations might be too distant from each other to directly receive signals from each other, or an obstacle that blocks the signals might exist between the two terminal stations. The two terminal stations under such situation are called hidden terminals from each other.

Since the above-mentioned carrier sense does not effectively function between the hidden terminals, one terminal station might start data packet transmission while the other terminal station is transmitting a data packet, and in this case, collision of packets occurs in another terminal station located at an intermediate position between the two terminal stations, whereby normal reception cannot be carried out.

In order to solve the above-mentioned problem, there has conventionally been provided a method for ensuring a communication medium by exchanging a transmission request packet (hereinafter referred to as "RTS")/a transmission path open request packet (hereinafter referred to as "CTS") between terminal stations performing communication, before data packet transmission (refer to "Wireless LAN Medium Access Control and Physical Layer Specifications, IEEE Std 802.11, August, 1999": Nonpatent Document 1).

The method of ensuring a communication medium using RTS and CTS is effective as a solution to the problem that occurs between hidden terminals.

However, since the RTS or CTS is originally a command to forbid transmission from a terminal station other than the destination terminal station, incommunicable terminal stations may occur in a chain reaction, depending on the network construction, leading to a reduction in data transmission efficiency.

In order to solve the above-mentioned problem, there is conventionally proposed a communication system in which RTS and CTS are relayed through another terminal prior to data packet communication (refer to Japanese Published Patent Application No. 2002-353975: Patent Document 1). To be specific, when plural radio stations, which are in a network construction shown in FIG. 1, perform communication using RTS/CTS, an RTS including transmission source and destination addresses which is issued from a terminal station is relayed by the respective terminal stations as RTSR (RTS Reeat) before communication, thereby simultaneously establishing plural communications among which no collision of data packets occur, in the communication network.

Further, generally, there is an access control method called TDMA (Time Division Multiple Access) in which plural terminal stations share one frequency alternately for every short period. This method is used for a PDC (Personal Digital Cellular) as a next generation cellular phone system or a PHS (Personal Handy phone System).

In the TDMA method, since a time to be assigned to each terminal station, which is called a slot, and an access timing to the communication medium are controlled by a base station, each terminal station can occupy the communication medium during the slot assigned thereto, whereby throughput is ensured. Accordingly, in contrast to the CSMA method, the TDMA method has no reduction in throughput due to hidden terminals.

However, the TDMA method requires a control station for controlling access time and timing to the communication medium. Further, installation of the control station leads to a complicated system and increased cost, and therefore, it is difficult to use the TDMA method for communication that occurs temporarily.

In order to solve this problem, there is a conventional method in which an access time to the communication medium is divided into access times for plural terminal stations to constitute slots as communication occupation times, and thereafter, each terminal station notifies the neighboring terminal stations of its reception slot according to the amount of reception data, whereby complicated communication band reservation procedure is dispensed with (for example, refer to Japanese Published Patent Application No. 2004-215073: Patent Document 2). Using this method, transmission of sync data can be carried out between arbitrary terminal stations, without providing a base station.

Hereinafter, the communication method disclosed in Patent Document 2 will be described in more detail.

In Patent Document 2, each terminal receives a beacon packet at a specific timing from a neighboring terminal, and synchronization is autonomously achieved between the respective terminals on the basis of the transmission timing of the beacon packet and information required for constituting a slot, which is included in the beacon packet. FIG. 18 is a diagram illustrating the construction of a frame period employed in the conventional communication method. FIG. 19 is a diagram illustrating the positions of reception slots of the respective terminals in the conventional communication method.

With reference to FIG. 18, in the frame period, a beacon slot (S0:BSLT) for transmitting a beacon at a predetermined timing and data slots (S1~S47:DSLT) for receiving data are arranged, that is, the frame period (FLMP) comprises these 48 pieces of slots. The beacon slot (S0) in the frame period (FLMP) is provided as a position in which each terminal performs transmission of its own beacon signal. The data slots (S1~S47) in the frame period (FLMP) are provided to clarify that, when each terminal sets at least one reception slot (RSLT), the set reception slot (RSLT) is located in a position corresponding to which timing from the position where the terminal performs transmission of its beacon signal (BCN), in order to prevent each terminal from colliding with the neighboring other terminals.

Each terminal adjusts the beacon packet transmission position and the position of the reception slot (RSLT) so as not to overlap with those of other terminals, and when data reception occurs in the reception slot of the self-terminal, the reception slot is increased or decreased according to the amount of data to be received, thereby constituting the slots without a base station to perform communication of sync data. That is, each terminal previously discloses the reception slot (RSLT) of the self-terminal in the beacon packet, and when performing data communication between terminals, the terminal holding data performs transmission of the data using the reception slot (RSLT) disclosed by the destination terminal to which the data is to be transmitted.

In the communication system disclosed in Patent Document 1, however, since the procedure of relaying RTS and CTS in each terminal station is unclear, it is difficult to use the system for a network whose network construction is dynamically changed. Further, since the communication medium that is ensured by the RTS and CTS is temporarily one, it is impossible to ensure throughput of each terminal station through the whole network.

Further, in the communication method disclosed in Patent Document 2, each terminal station discloses only the reception slot (RSLT) that is the timing at which the terminal station desires to receive data, and performs transmission of data using the reception slot (RSLT) that is disclosed by the destination terminal when performing data communication. Therefore, if there is a hidden terminal in the network, the reception slot (RSLT) might be used by the unspecified terminal, which might cause data collision. More specifically, for example, when performing data transmission from the first terminal to the second terminal, the second terminal starts data transmission using the reception slot (RSLT) disclosed by the first terminal. However, if, at the same time, the third terminal which is a hidden terminal with respect to the second terminal starts data transmission using the same reception slot (RSLT) to the first terminal, collision of the data from the second terminal and the data from the third terminal occurs in the first terminal. That is, the communication method of Patent Document 2 has a problem that reliable and efficient communication cannot be carried out when a hidden terminal exists against communications from plural terminals.

As a method to solve this problem, the above-mentioned RTS/CTS can be applied to the communication method of Patent Document 2. In this case, however, it becomes necessary to repeat the RTS/CTS procedure for every packet, leading to a reduction in throughput.

So, it may be thought that the above-mentioned RTS/CTS procedure is performed not for every packet but at only the beginning of successively transmitted data. Also in this case, however, the band reservation procedure is required eventually, and thereby the feature of Patent Document 2, that is, data communication being carried out by only managing the reception slot of the self-terminal, is lost.

SUMMARY OF THE INVENTION

The present invention is made to solve the above-mentioned problems and has for its object to provide a communication system, a communication control method, a communication control apparatus, and a communication control program, which can ensure throughputs among terminals without being affected by hidden terminals while sharing a communication medium among the terminals, in a communication network in which no control station exists or, even when a control station exists, it does not perform control of access to the communication medium.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a 1st aspect of the present invention, there is provided a communication system which performs data communication with a communication medium being shared among terminals for peer-to-peer communication, in a communication network comprising plural terminals, wherein no control station exists or, even when a control station exists, it does not control access to the communication medium, and each of the terminals comprising: a time sync unit for establishing time synchronization with another terminal to which the terminal communicates, using time sync information for establishing time synchronization relating to an access timing to the communication medium; and a communication monitor unit for monitoring the time sync information that is transmitted and received in communication between other terminals; wherein the time sync information, which is obtained in the communication between other terminals by the communication monitor unit, is transmitted to a terminal different from the other terminals, in which no time synchronization has been established. Therefore, the effects of hidden terminals can be reduced while sharing the communication medium among plural terminals, and throughput can be ensured.

According to a 2nd aspect of the present invention, in the communication system according to the 1st aspect, each terminal establishes time synchronization of the self-terminal on the basis of the time sync information obtained by the communication monitor unit. Therefore, time synchronization can easily be established between terminals which can directly communicate with each other.

According to a 3rd aspect of the present invention, in the communication system according to the 2nd aspect, when each terminal cannot obtain the time sync information which is exchanged in the communication between other terminals, the terminal transmits the time sync information to make a request of establishing time synchronization, when it starts transmission. Therefore, even when there exists a hidden terminal, time synchronization can be established with the terminal.

According to a 4th aspect of the present invention, in the communication system according to the 3rd aspect, when each terminal has already established time synchronization with a terminal other than the source terminal of the time sync information, upon reception of the time sync information from the source terminal, the terminal returns time sync information corresponding to the time synchronization to the source terminal of the time sync information.

According to a 5th aspect of the present invention, in the communication system according to the 4th aspect, when each terminal receives sync time information that has been established with another terminal, as a response to the time sync establishment request, the terminal establishes time synchronization of the self-terminal according to the received sync time information. Therefore, time synchronization can be easily established at all terminals existing in the communication network.

According to a 6th aspect of the present invention, in the communication system according to the 1st aspect, the time sync information includes at least one of communication time information, communication period information, time information which can be transmitted by a terminal for every period of time synchronization, and transmission start time information.

According to a 7th aspect of the present invention, in the communication system according to the 1st aspect, each terminal sets time synchronization of the self-terminal on the basis of the time when the terminal receives the time sync information.

According to an 8th aspect of the present invention, there is provided a communication control method for performing data communication between arbitrary terminals using a time-division multiplexing connection method, in a communication network comprising plural terminals, wherein no control station exists or, even when a control station exists, it does not control access to the communication medium; the method comprising, during stationary operation: a slot notification step of notifying slot information which represents the status of use of slots that are units of communication time, and comprises a self-terminal use slot indicating a slot that is currently used by the self-terminal and other-terminal use slots indicating slots that are used by terminals other than the self-terminal, to all of the other terminals existing in positions to which the terminal can directly communicate; and a terminal information management step of managing the slot information of all of the plural terminals including the notified slot information; and the method comprising, when performing data communication between arbitrary terminals: an empty slot detection step of detecting an empty slot that is not being used, by using the slot information of all of the plural terminals, which information is managed in the terminal information management step of a terminal on the data communication start side; and a data communication step of performing data communication, by using an empty slot that is detected in the empty slot detection step. Therefore, when performing data communication using the time-division multiplexing connection method in the communication network comprising plural terminals, a communication band is ensured without being affected by hidden terminals, whereby throughput can be ensured with reliability.

According to a 9th aspect of the present invention, in the communication control method according to the 8th aspect, the empty slot detection step excludes, from all slots, the self-terminal use slots of all terminals existing in positions to which the communication start side terminal can directly communicate, which slots are managed in the terminal information management step of the data communication start side terminal, and recognizes the remaining slots as empty slots. Therefore, an empty slot can be speedily detected on the basis of the slot information of all of the plural terminals managed by the communication start side terminal, thereby preventing the plural terminals from using the same slot.

According to a 10th aspect of the present invention, in the communication control method according to the 9th aspect, when it is determined that there is a hidden terminal with which the data communication start side terminal cannot directly communicate, the empty slot detection step excludes, from the remaining slots, the other-terminal use slot of the data communication response side terminal, which is managed in the terminal information management step of the communication start side terminal, and regards slots that remain at this time, as empty slots. Therefore, even when a hidden terminal exists, an empty slot can be detected on the basis of the slot information of all of the plural terminal managed by the communication start side terminal, thereby preventing the plural terminals from using the same lot.

According to an 11th aspect of the present invention, in the communication control method according to the 8th aspect, the empty slot detection step excludes, from all slots, the self-terminal use slots and the other-terminal use slots of all terminals existing in positions to which the communication start side terminal can directly communicate, which are managed in the terminal information management step of the data communication start side terminal, and regards the remaining slots as empty slots. Therefore, an empty slot can be reliably detected by a simple procedure on the basis of the slot information of the all terminals managed by the communication start side terminal, without determining whether a hidden terminal exists or not.

According to a 12th aspect of the present invention, in the communication control method according to the 8th aspect, the terminal information management step manages the specific IDs of the plural terminals in association with the slot information notified from the respective terminals. Therefore, even when a part of a communication network area overlaps another communication network area or when plural terminals in the communication network constitute plural logic networks, band assurance communication can be easily realized when performing data communication between terminals in the other communication network.

According to a 13th aspect of the present invention, there is provided a communication control method for performing data communication between arbitrary terminals using a time-division multiplexing connection method, in a communication network comprising plural terminals, wherein no control station exists or, even when a control station exists, it does not control access to the communication medium; the method comprising, during stationary operation: a slot notification step of notifying slot information which represents the status of use of slots that are units of communication time, and comprises self-terminal nonuse slots indicating slots that are not currently used by a self-terminal and other-terminal nonuse slots indicating slots that are not used by terminals other than the self-terminal, to all of the other terminals existing in positions with which the terminal can directly communicate; and a terminal information management step of managing the slot information of all of the plural terminals including the notified slot information, every time the slot information is notified from the other terminal; and the method comprising, when performing data communication between arbitrary terminals: an empty slot detection step of detecting an empty slot that is not being used, by using the slot information of all of the plural terminals, which information is managed in the terminal information management step of a terminal on the data communication start side; and a data communication step of performing data communication, by using an empty slot that is detected in the empty slot detection step. Therefore, when performing data communication using the time-division multiplexing connection method in the communication network comprising the plural terminals, a communication band can be ensured without being affected by hidden terminals.

According to a 14th aspect of the present invention, in the communication control method according to the 13th aspect, the empty slot detection step regards, as an empty slot, a common slot among the self-terminal nonuse slots of all terminals existing in positions with which the communication start side terminal can directly communicate, which slots are managed in the terminal information management step of the data communication start side terminal.

According to a 15th aspect of the present invention, in the communication control method according to the 14th aspect, when it is determined that there is a hidden terminal with which the data communication start side terminal cannot directly communicate, the empty slot detection step regards, as an empty slot, the other-terminal nonuse slot of the data communication response side terminal, which is managed in the terminal information management step of the communication start side terminal.

According to a 16th aspect of the present invention, in the communication control method according to the 13th aspect, the empty slot detection step regards, as an empty slot, a common slot among the self-terminal nonuse slots and the other-terminal nonuse slots of all terminals existing in positions with which the communication start side terminal can directly communicate, which are managed in the terminal information management step of the data communication start side terminal.

According to a 17th aspect of the present invention, in the communication control method according to the 13th aspect, the terminal information management step manages the specific IDs of the plural terminals in association with the slot information notified from the respective terminals. Therefore, even when a part of a communication network area overlaps another communication network area or when plural terminals in the communication network constitute plural logic networks, band assurance communication can be easily realized when performing data communication between terminals in the other communication network.

According to an 18th aspect of the present invention, there is provided a communication control apparatus of each terminal, which performs data communication using a time-division multiplexing connection method between arbitrary terminals, in a communication network comprising plural terminals, wherein no control station exists or, even when a control station exists, it does not control access to the communication medium, the apparatus comprising: a communication control unit for notifying slot information which represents the status of use of slots that are units of communication time, and comprises a self-terminal use slot indicating a slot that is currently used by a self-terminal and other-terminal use slots indicating slots that are used by terminals other than the self-terminal, to all of the other terminals existing in positions with which the terminal can directly communicate, at an arbitrary timing, during stationary operation, and controlling the data communication to be performed between arbitrary terminals; a terminal information management unit for managing the slot information of all of the plural terminals including the notified slot information, every time the slot information is notified from the other terminal; and an empty slot detection unit for detecting an empty slot that is not being used, by using the slot information of all of the plural terminals, which information is managed by the terminal information management unit of a terminal on the data communication start side, when performing the data communication between arbitrary terminals. Therefore, an empty slot can be reliably detected, whereby a communication band can be ensured without being affected by hidden terminals when performing data communication using the time-division multiplexing connection method in the communication network comprising the plural terminals.

According to a 19th aspect of the present invention, in the communication control apparatus according to the 18th aspect, the empty slot detection unit excludes, from all slots, the self-terminal use slots of all terminals existing in positions to which the communication start side terminal can directly communicate, which slots are managed by the terminal information management unit of the data communication start side terminal, and recognizes the remaining slots as empty slots. Therefore, an empty slot can be speedily detected by a simple procedure on the basis of the slot information of the all terminals managed by the data communication start side terminal, thereby preventing the plural terminals from using the same slot when performing data communication between arbitrary terminals.

According to a 20th aspect of the present invention, in the communication control apparatus according to the 19th aspect, when it is determined that there is a hidden terminal to which the data communication start side terminal cannot directly communicate, the empty slot detection unit excludes, from the remaining slots, the other-terminal use slot of the data communication response side terminal, which is managed in the terminal information management unit of the communication start side terminal, and regards slots that remain at this time, as empty slots. Therefore, even when a hidden terminal exists, an empty slot can be detected by a simple procedure on the basis of the slot information of the all terminals managed by the communication start side terminal, thereby preventing the plural terminals from using the same slot when performing data communication.

According to a 21st aspect of the present invention, in the communication control apparatus according to the 18th aspect, the empty slot detection unit excludes, from all slots, the self-terminal use slots and the other-terminal use slots of all terminals existing in positions to which the communication start side terminal can directly communicate, which are managed by the terminal information management unit of the data communication start side terminal, and regards the remaining slots as empty slots. Therefore, an empty slot can be reliably detected by a simple procedure on the basis of the slot information of the all terminals managed by the communication start side terminal, without determining whether a hidden terminal exists or not, thereby preventing the plural terminals from using the same slot.

According to a 22nd aspect of the present invention, in the communication control method according to the 18th aspect, the terminal information management unit manages the specific IDs of the plural terminals in association with the slot information notified from the respective terminals. Therefore, even when a part of a communication network area overlaps another communication network area or when plural terminals in the communication network constitute plural logic networks, band assurance communication can be easily realized when performing data communication between terminals in the other communication network.

According to a 23rd aspect of the present invention, there is provided a communication control apparatus of each terminal, which performs data communication using a time-division multiplexing connection method between arbitrary terminals, in a communication network comprising plural terminals, wherein no control station exists or, even when a control station exists, it does not control access to the communication medium, the apparatus comprising: a communication control unit for notifying slot information which represents the status of use of slots that are units of communication time, and comprises self-terminal nonuse slots indicating slots that are not currently used by a self-terminal and other-terminal nonuse slots indicating slots that are not used by terminals other than the self-terminal, to all of the other terminals existing in positions with which the terminal can directly communicate, at an arbitrary timing, during stationary operation, and controlling the data communication to be performed between arbitrary terminals; a terminal information management unit for managing the slot information of all of the plural terminals including the notified slot information, every time the slot information is notified from the other terminal; and an empty slot detection unit for detecting an empty slot that is not being used, by using the slot information of all of the plural terminals, which information is managed by the terminal information management unit of a terminal on the data communication start side, when performing the data communication between arbitrary terminals. Therefore, when performing data communication using the time-division multiplexing connection method in the communication network comprising the plural terminals, a communication band can be ensured without being affected by hidden terminals.

According to a 24th aspect of the present invention, in the communication control apparatus according to the 23rd aspect, the empty slot detection unit regards, as an empty slot, a common slot among the self-terminal nonuse slots of all terminals existing in positions with which the communication start side terminal can directly communicate, which slots are managed by the terminal information management unit of the data communication start side terminal.

According to a 25th aspect of the present invention, in the communication control apparatus according to the 24th aspect, when it is determined that there is a hidden terminal with which the data communication start side terminal cannot directly communicate, the empty slot detection unit regards, as an empty slot, the other-terminal nonuse slot of the data communication response side terminal, which is managed by the terminal information management unit of the communication start side terminal.

According to a 26th aspect of the present invention, in the communication control apparatus according to the 23rd aspect, the empty slot detection unit regards, as an empty slot, a common slot among the self-terminal nonuse slots and the other-terminal nonuse slots of all terminals existing in positions with which the communication start side terminal can directly communicate, which are managed by the terminal information management unit of the data communication start side terminal.

According to a 27th aspect of the present invention, in the communication control apparatus according to the 23rd aspect, the terminal information management unit manages the specific IDs of the plural terminals in association with the slot information notified from the respective terminals. Therefore, even when a part of a communication network area overlaps another communication network area or when plural terminals in the communication network constitute plural logic networks, band assurance communication can be easily realized when performing data communication between terminals in the other communication network.

According to a 28th aspect of the present invention, there is provided a communication control program possessed by each terminal, which program makes a computer perform a communication control process of performing data communication between arbitrary terminals using a time-division multiplexing connection method, in a communication network comprising plural terminals, wherein no control station exists or, even when a control station exists, it does not control access to the communication medium; the program comprising, during stationary operation: a slot notification step of notifying slot information which represents the status of use of slots that are units of communication time, and comprises a self-terminal use slot indicating a slot that is currently used by a self-terminal and other-terminal use slots indicating slots that are used by terminals other than the self-terminal, to all of the other terminals existing in positions with which the terminal can directly communicate; and a terminal information management step of managing the slot information of all of the plural terminals including the notified slot information, every time the slot information is notified from the other terminal; and the program comprising, when performing data communication between arbitrary terminals: an empty slot detection step of detecting an empty slot that is not being used, by using the slot information of all of the plural terminals, which information is managed in the terminal information management step of a terminal on the data communication start side; and a data communication step of performing data communication, by using an empty slot that is detected in the empty slot detection step. Therefore, when performing data communication using the time-division multiplexing connection method in the communication network comprising the plural terminals, a communication band can be ensured without being affected by hidden terminals, whereby throughput can be ensured with higher reliability.

According to a 29th aspect of the present invention, there is provided a communication control program possessed by each terminal, which program makes a computer perform a communication control process of performing data communication between arbitrary terminals using a time-division multiplexing connection method, in a communication network comprising plural terminals, wherein no control station exists or, even when a control station exists, it does not control access to the communication medium; the program comprising, during stationary operation: a slot notification step of notifying slot information which represents the status of use of slots that are units of communication time, and comprises self-terminal nonuse slots indicating slots that are not currently used by a self-terminal and other-terminal nonuse slots indicating slots that are not used by terminals other than the self-terminal, to all of the other terminals existing in positions with which the terminal can directly communicate; and a terminal information management step of managing the slot information of all of the plural terminals including the notified slot information, every time the slot information is notified from the other terminal; and the program comprising, when performing data communication between arbitrary terminals: an empty slot detection step of detecting an empty slot that is not being used, by using the slot information of all of the plural terminals, which information is managed by the terminal information management unit of a terminal on the data communication start side; and a data communication step of performing data communication, by using an empty slot that is detected by the empty slot detection unit. Therefore, when performing data communication using the time-division multiplexing connection method in the communication network comprising the plural terminals, a communication band can be ensured without being affected by hidden terminals, whereby throughput can be ensured with higher reliability.

BRIEF DESCRIPTION OF THE DRAWINGS

FIG. 3 is a diagram illustrating the structures of a sync communication request packet and a sync communication response packet in the radio communication system according to the first embodiment.

FIG. 11 is a flowchart for realizing a time-division multiplexing access by a communication control method according to the second embodiment, wherein FIG. 11(a) is a flowchart illustrating an initial operation of a terminal immediately after power-on or reset, and FIG. 11(b) is a flowchart illustrating a stationary operation of the terminal in a state other than the initial state.

FIG. 14 is a diagram illustrating slot information that is managed by a terminal information management unit according to the second embodiment, wherein FIG. 14(a) shows slot information managed by terminal information management units of the respective terminals in the case where no terminal performs sync communication, FIG. 11(b) shows slot information managed by the terminal information management units of the respective terminals in the case where terminal F transmits a slot communication confirmation response packet, FIG. 14(c) shows slot information managed by the terminal information management units of terminals G and H in the case where terminal F performs slot notification, FIG. 14(d) shows slot information managed by the terminal information management units of terminals G and H in the case where terminal E performs slot notification, and figure (e) shows slot information managed by the terminal information management unit of terminal H in the case where terminal G performs slot notification.

FIG. 19 is a diagram illustrating positions of reception slots of the respective terminals in the conventional communication method.

DETAILED DESCRIPTION OF THE PREFERRED EMBODIMENTS

Hereinafter, preferred embodiments of the present invention will be described with reference to the drawings. In the present invention, it is assumed that "sync data" is a digitized signal that needs realtime response and tautochronism, such as a moving picture signal or an audio signal, or an accumulation thereof, and "async data" is a command that occurs asynchronously, such as a command notification and an inquiry, other than the sync data. Further, although a communication system comprising plural terminals may be either wired or wireless (radio), a radio communication system is employed in the present invention. Further, although any means may be used for connection to a communication medium as long as it performs data communication utilizing the same frequency band, IEEE 802.11b having a transmission speed of 11 Mbps is employed in the present invention.

Embodiment 1

A first embodiment of the present invention relates to a communication system in which data communication is carried out with a communication medium being shared among plural terminals for peer-to-peer communication, in a communication network comprising the plural terminals and having no control station, wherein each of the terminals stores time sync information for establishing time synchronization relating to an access timing to the communication medium into a packet to be exchanged between the terminals, and establishes time synchronization between the terminals according to the time sync information, and simultaneously, forms a dummy slot for performing sync communication between the terminals, thereby ensuring throughput between the terminals.

Figure 1:
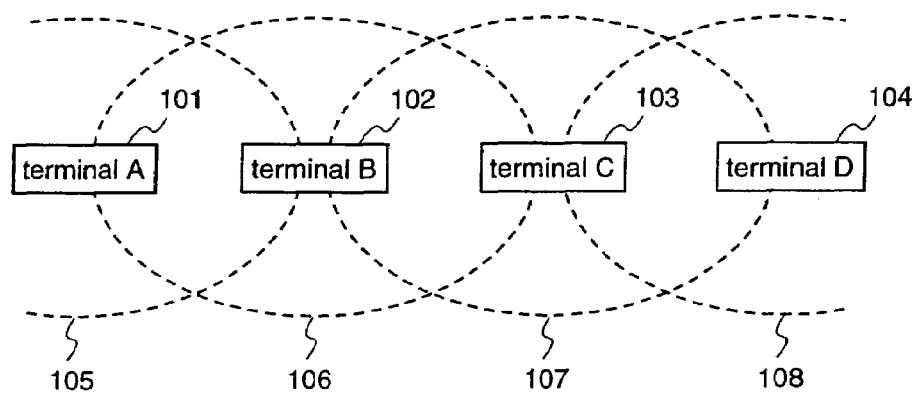
FIG. 1 is a diagram illustrating a network structure of a radio communication system according to a first embodiment of the present invention.

FIG. 1 is a network construction diagram of a radio communication system according to the first embodiment of the present invention.

In FIG. 1, reference numerals 101~104 denote communication terminals having specific IDs, terminal A, terminal B, terminal C, and terminal D, respectively. In FIG. 1, the terminals 101~104 are distributed on the same space as a communication medium. Dotted lines 105~108 denote communication areas of the terminals A101, B102, C103, and D104, respectively. In FIG. 1, each terminal cannot directly communicate with all of the other terminals, and a hidden terminal exists with respect to each terminal. To be specific, the terminal C103 and the terminal D104 cannot directly receive a signal transmitted from the terminal A101, the terminal D104 cannot directly receive a signal transmitted from the terminal B102, the terminal A101 cannot receive a signal transmitted from the terminal C103, and the terminals A101 and the terminal B102 cannot receive a signal transmitted from the terminal D104.

Next, the internal structures of the respective terminals A~D will be described with reference to FIG. 2.

Figure 2:
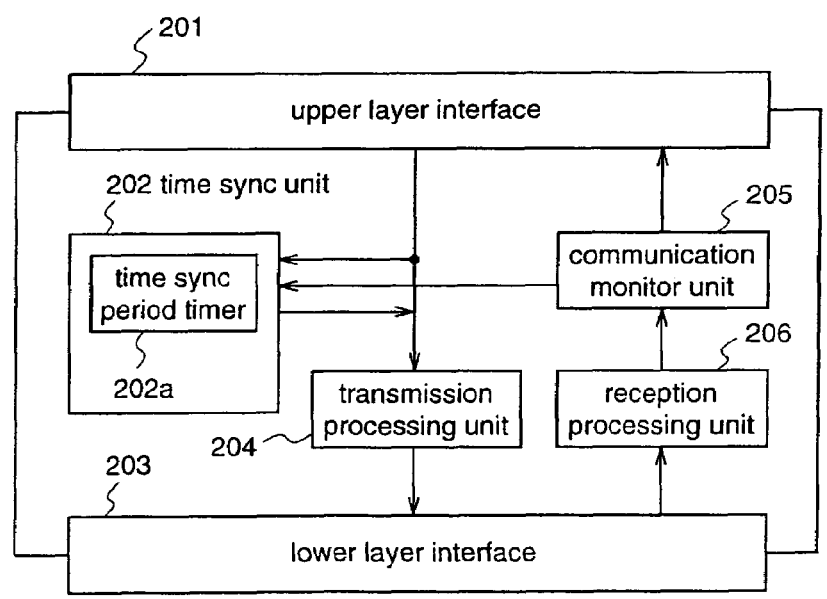
FIG. 2 is a block diagram illustrating the internal structure of each terminal of the radio communication system according to the first embodiment.

FIG. 2 is a block diagram illustrating the construction of a part of each terminal of the radio communication system according to the first embodiment, which part relates to data communication.

In FIG. 2, each of the terminals A~D comprises an upper layer interface 201, a time sync unit 202, a lower layer interface 203, a transmission processing unit 204, a communication monitor unit 205, and a reception processing unit 206.

The upper layer interface 201 is an interface to an upper layer of a communication terminal which is not shown, and it is connected to a block treating video and audio data, such as a PC or AV equipment. The time sync unit 202 treats time sync information for establishing time synchronization relating to an access timing to a communication medium, and contains a time sync period timer 202a. The lower layer interface 203 is an interface to a lower layer in each of the terminals A~D, and it is connected to a block performing transmission/reception of data by the IEEE 802.11b scheme or the like.

The transmission processing unit 204 generates, as a packet, a transmission request from an upper layer through the upper layer interface 201 or a transmission request generated in the terminal, and notifies a lower layer through the lower layer interface 203. The detailed construction of the generated packet will be described later.

The communication monitor unit 205 monitors the time sync information in communication with another terminal, which is included in the data received through the lower layer interface 203. The time sync information will be described later.

The reception processing unit 206 receives a packet from the lower layer through the lower layer interface 203, and notifies the upper layer of the received packet through the upper layer interface 201 or processes the packet in the terminal. The detailed construction of the packet to be processed in the terminal will be described later.

Next, a description will be given of the constructions of a sync communication request packet (FIG. 3(*a*)) and a sync communication response packet (FIG. 3(*b*)) which are exchanged to establish time synchronization between plural terminals in the radio communication system according to the first embodiment.

As shown in FIG. 3, the construction of each of the sync communication request packet 310 and the sync communication response packet 320 is divided into fields depending on the contents, and each packet includes time sync information that is needed for establishing time synchronization relating to an access timing to the communication medium.

The sync communication request packet 310 is composed of, as shown in FIG. 3(*a*), a destination terminal ID field 301, a source terminal ID field 302, a time sync period field 303, a slot time field 304, an offset field 305, a slot number field 306, a reservation field 307, and a packet type field 309. The sync communication response packet 320 is composed of, as shown in FIG. 3(*b*), a destination terminal ID field 301, a source terminal ID field 302, a time sync period field 303, a slot time field 304, an offset field 305, a slot number field 306, a status field 308, and a packet type field 309. The respective fields 301~309 and 309 are common fields which are common to the sync communication request packet 310 and the sync communication response packet 320.

Hereinafter, the respective fields will be described in detail. The destination terminal ID field 301 is an address field indicating a destination terminal, and the source terminal ID field 302 is an address field indicating a source terminal. The time sync period field 303 is a field indicating information of a time sync period for establishing time synchronization, the slot time field 304 is a field indicating time information for further dividing a period designated by the time sync period field 303, the offset field 305 is a field indicating a time elapsed from a time sync period that is set at transmission of the sync communication request packet 310 or the sync communication response packet 320, and the slot number field 306 is a field indicating, in the sync communication request packet 310, information about a slot number to be used, and indicating, in the sync communication response packet 320, information about a slot number that is requested for use or is currently used by the sync communication request packet 310. In this first embodiment, a slot number is informed by mapping the slot number to each bit of the field 306. For example, when the sync slot in which communication is to be carried out is slot 1, "1" is set at the bit number 0 in the slot number field 306 ("00000000_00000001"). When the sync slot in which communication is to be carried out is slot 2, "1" is set at the bit number 1 in the slot number field 306 ("00000000_00000010"). The method for notifying the slot number is not restricted to that mentioned above, any method may be employed as long as each terminal can recognize the slot number.

The packet type field 309 is a packet ID field indicating the packet type, and whether the corresponding packet is the sync communication request packet 310 or the sync communication response packet 320 is determined according to the value of this field.

The reservation field 307 is a field that exists only in the sync communication request packet 310, and includes no information because it is a field for matching the packet construction to that of the sync communication response packet 320. Further, the status field 308 is a field indicating a result of response to a sync establishment request that is outputted from a certain terminal between communication terminals. As for the result of response, a status code having a meaning of, for example, "success", "failure", "already used slot", or "sync is already established" is set.

The time sync information is composed of the time sync period field 303, the slot time field 304, the offset field 305, and the slot number field 306, which are included in the packets 310 and 320, and this time sync information is used for forming a dummy slot shown in FIG. 4 which will be described later.

In FIG. 3, convenient lengths of the respective fields included in the sync communication request packet 310 and the sync communication response packet 320 are shown. Each of the destination terminal ID field 301 and the source terminal ID field 302 has a length of 6 bytes, and each of the time sync period field 303, the slot time field 304, the offset field 305, the slot number field 306, the reservation field 307, the status field 308, and the packet type field 309 has a length of 2 bytes. The lengths of the respective fields are conveniently set, and the present invention is not restricted thereto.

Next, a description will be given of dummy slots that are established on the basis of the time sync information included in the sync communication request packet and the sync communication response packet, for ensuring the throughputs of the terminals A~D.

Figure 4:
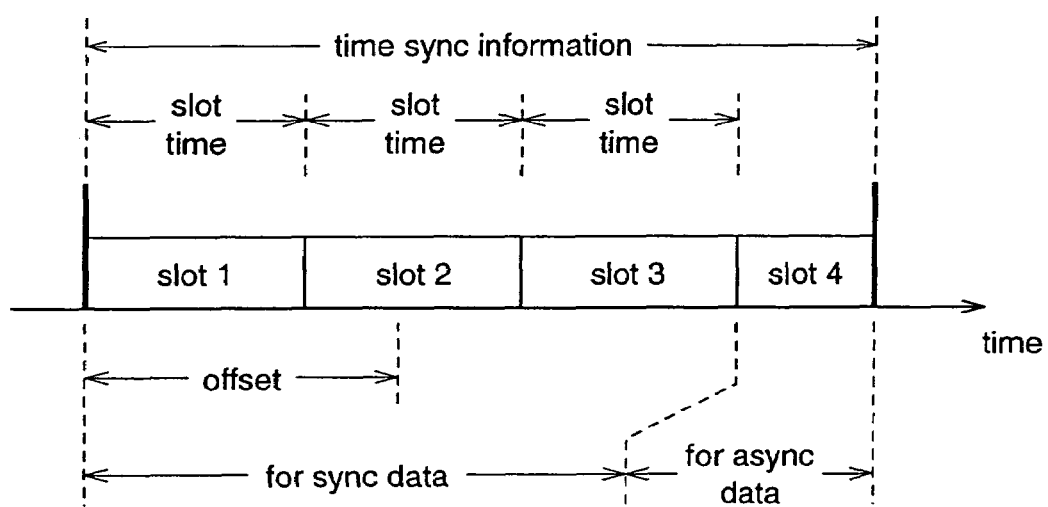
FIG. 4 is a conceptual diagram illustrating slots which are established by time sync information in the radio communication system according to the first embodiment.

FIG. 4 is a conceptual diagram illustrating slots which are established on the basis of the time sync information in the radio communication system according to the first embodiment, wherein time passes in the direction of an arrow.

As shown in FIG. 4, in this first embodiment, three slots for transmitting sync data (hereinafter simply referred to as sync slots) and a slot for transmitting async data (hereinafter simply referred to as async slot) are arranged, and slots are formed by periodically repeating this arrangement.

In FIG. 4, the time sync cycle is based on the period information which is set in the time sync period field 303 in the sync communication request packet 310 or the sync communication response packet 320, and the slot time is based on the time information that is set in the slot time field 304 in the packets 310 and 320. Further, the offset is based on the elapsed time information from the time sync period, which is set in the offset field 305 in the packets 310 and 320, and each terminal which receives the packet including the time sync information at an arbitrary time can recognize the start of the time sync period by using the offset value.

Further, in this first embodiment, the slot time is a value smaller than the value of the time sync period. A slot time that can be secured within the time sync period is denoted as a sync slot, and a remaining time smaller than the slot sync time is denoted as an async slot. Each of the above-mentioned slots is given a conceptional number, and specifically, the first slot in the period is denoted as "slot 1", and the following slots are given serial numbers that are incremented 1 by 1 in the time axis direction, regardless whether the slots are sync slots or async slots. A slot next to the final slot in the period, i.e., the first slot in the next period, is given the number of "slot 1" again, and serial numbers that are incremented 1 by 1 in the time axis direction are set from the next slot. The slot construction shown in FIG. 4 is merely an example, and the present invention is not restricted thereto.

Next, a description will be given of the procedure of establishing time synchronization among the terminals A~D in the ratio communication system according to the first embodiment, with reference to FIG. 5.

Figure 5:
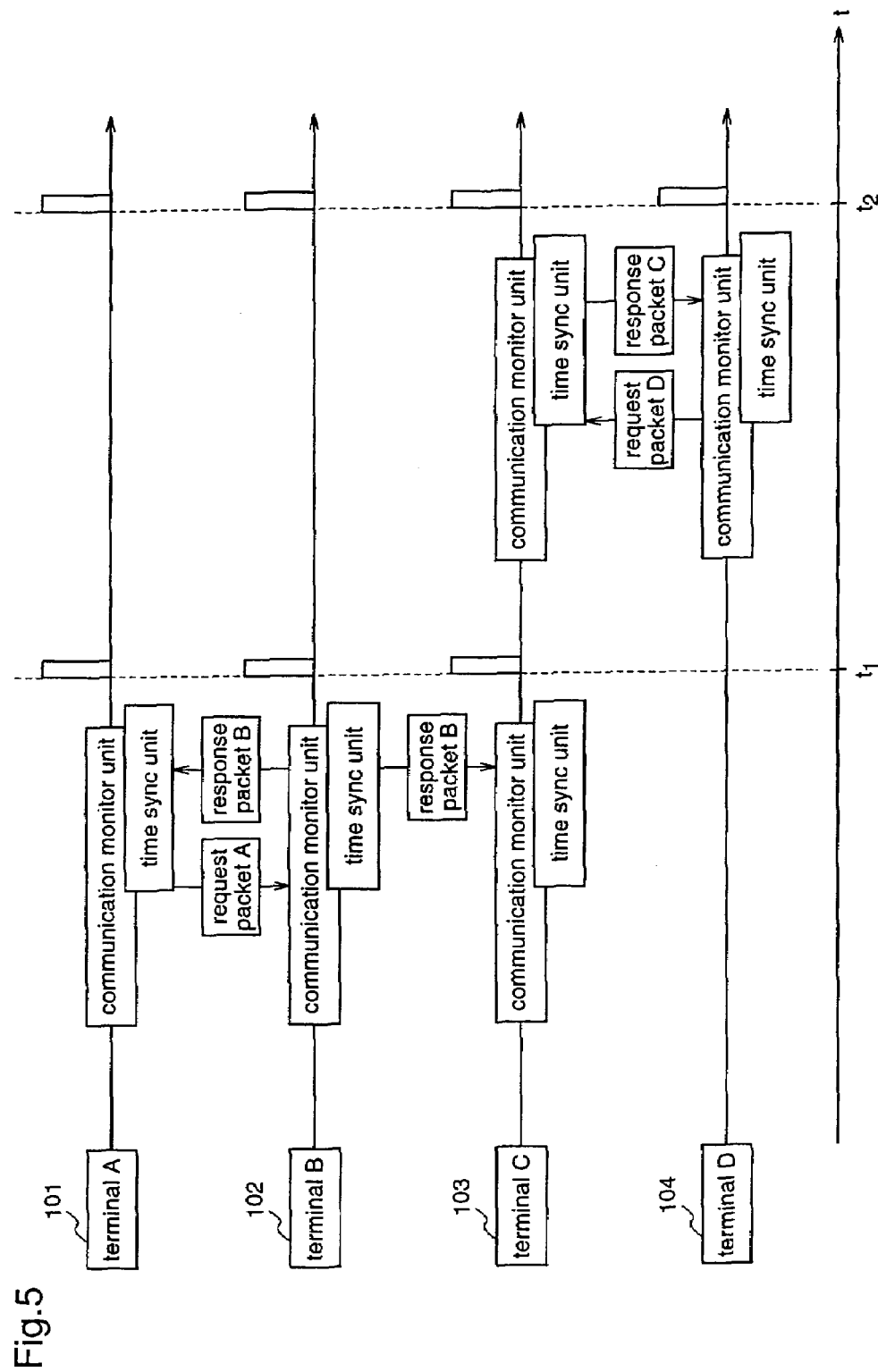
FIG. 5 is a diagram for explaining the procedure until establishing time synchronization relating to an access timing to a communication medium, in the radio communication system according to the first embodiment.

FIG. 5 is a diagram for explaining the procedure until time synchronization relating to the access timing to the communication medium is established, in the radio communication system according to the first embodiment. In FIG. 5, an arrow in the horizontal direction indicates time, and time passes rightward. Further, in FIG. 5, when communication is carried out by the respective terminals A~D, the source terminal and the destination terminal are expressed by arrows in the vertical direction, and the types of packets to be transmitted/received are shown with the arrows in the vertical direction.

Initially, assuming that a request of sync communication with the terminal B102 is generated in the terminal A101, the time sync unit 202 of the terminal A101 outputs time sync information for establishing time synchronization between the terminals A and B to the transmission processing unit 204, and the transmission processing unit 204 creates a sync communication request packet A including the time sync information and outputs the packet A to the terminal B102. The sync communication request packet A created by the terminal A101 is a packet in which, for example, "terminal B" is set in the destination terminal ID field 301, "terminal A" is set in the source terminal ID field 302, "1000 msec" is set in the time sync period field 303, "200 msec" is set in the slot time field 304, "0" is set in the offset field 305, "slot 1" is set in the slot number field 306, and "sync communication request packet" is set in the packet type field 309. The time sync information described here (corresponding to the fields 303~306) are given the conveniently set values, and the present invention is not restricted thereto.

The terminal B102 that receives the above-mentioned sync communication request packet A processes the received packet by the reception processing unit 206, and thereafter, outputs the packet to the communication monitor unit 205. On receipt of the sync communication request packet B, the communication monitor unit 205 outputs the time sync information included in the packet B to the time sync unit 202. When the time sync unit 202, which has received the time sync information, determines that the terminal B itself has not yet established time synchronization and it may operate according to the time sync information included in the sync communication request packet A, the time sync unit 202 outputs time sync information which means permission for sync communication with the terminal A to the transmission processing unit 204, and the transmission processing unit 204 creates a sync communication response packet including the time sync information which means permission for sync communication and transmits the packet to the terminal A101. The "time sync information which means permission for sync communication" indicates exactly the same time sync information as the time sync information included in the received sync communication request packet A. That is, in the sync communication response packet B created by the terminal B102, "terminal A" is set in the destination terminal ID field 301, "terminal B" is set in the source terminal ID field 302, "information indicating success of sync establishment" is set in the status field 308, "sync communication response packet" is set in the packet type field 309, and the same information as those in the sync communication request packet A received from the terminal A101 are set in the fields 303~306 indicating the time sync information. On the other hand, when the time sync unit 202, which has received the time sync information, determines that the terminal B itself has already established time synchronization and it should not operate according to the time sync information included in the sync communication request packet A, the time sync unit 202 outputs a sync communication response packet which does not permit sync communication to the terminal A101. The sync communication response packet which does not permit sync communication will be specifically described later. Hereinafter, it is premised that the time sync unit 202 determines that the terminal B itself may operate according to the time sync information included in the sync communication request packet 303.

In the terminal B which has transmitted the sync communication response packet B, the time sync unit 202 sets the time sync period timer 202a simultaneously with completion of the transmission. Thereby, the terminal B establishes time synchronization with time t1 being a time sync period start position.

Further, in the terminal A101 which has received the time sync response packet B, the time sync unit 202 sets the time sync period timer 202a immediately after completion of the reception of the packet by the reception processing unit 206. Thereby, the terminal A101 establishes time synchronization with the time t1 being a time sync period start position, and the terminal A101 can perform sync communication with the terminal B102 by using the slot 1.

By the way, within the communication area of the terminal B102, the terminal C103 also exists other than the terminal A101. Accordingly, the terminal C103 can receive the sync communication response packet B which is transmitted from the terminal B102 to the terminal A101.

In the terminal C which has received the packet B, the communication monitor unit 205 checks the address that is set in the destination terminal ID field 301 of the received packet B to determine whether the packet B is directed to the self-terminal (in this case, the terminal C). When the received packet is a packet directed to a specific terminal other than the self-terminal, the packet directed to another terminal is usually discarded. However, when the time sync information is included in the packet directed to another terminal, the time sync information is extracted and outputted to the time sync unit 202, and thereafter, the packet is discarded.

The time sync unit 202 which has received the time sync information from the communication monitor unit 205 determines whether the terminal C itself has already established time synchronization or not. When the terminal C has not yet established synchronization, the time sync unit 202 establishes time synchronization using the received time sync information. That is, the terminal C itself calculates the start time of the next time sync period on the basis of the timing at which the terminal C as received the packet B including the time sync information, the time sync period within the time sync information, and the value of offset, and sets the time sync period timer 202a in the terminal C at the obtained timing. In this case, since the offset value is 0, the time sync period timer 202a is set at the time when the terminal C receives the packet B. Thereby, the terminal C103 can establish time synchronization with the time t1 being the time sync period start position.

Through the above-mentioned procedure, time synchronization is established not only between the terminal A101 and the terminal B102 which perform sync communication but also between the terminal A101 and the terminal C103 that can receive the sync communication response packet B. When the terminal C103 performs communication with another terminal after establishment of the time synchronization, since the terminal C103 recognizes the slot that is currently used, the terminal C103 does not perform transmission during the period of the slot being used, and therefore, the communication between the terminal A101 and the terminal B102 is not intercepted.

On the other hand, the terminal A101 and the terminal B102 are hidden terminals for the terminal D104, and the terminal D104 is located in a position where it cannot receive the time sync request packet A and the time sync response packet B. Therefore, at the time t1, the terminal D104 cannot establish time synchronization to be a time sync period start position, and further, the terminal D104 does not establish time synchronization with another terminal at the point in time, so that the time sync unit 202 of the terminal D104 recognizes that sync communication with another terminal has not yet been carried out.

When the terminal D104 desires to start sync communication with the terminal C103, the time sync unit 202 of the terminal D104 creates a sync communication request packet D and transmits it to the terminal C103. At this time, in the sync communication packet D transmitted from the terminal D104 to the terminal C103, "terminal C" is set in the destination terminal ID field 301, "terminal D" is set in the source terminal ID field, and "sync communication request packet" is set in the packet type field 309, and further, the time sync information included in the packet D is different from those established among the terminals A, B, and C. For example, "500 msec" is set in the time sync period field 303, "50 msec" is set in the slot time field 304, "0" is set in the offset field 305, and "slot 1" is set in the slot number field 306. The values of the time sync information described above are merely examples, and the present invention is not restricted thereto.

When the communication monitor unit 205 of the terminal C103 receives the communication sync request packet D, since the time sync unit 202 of the terminal C103 has already established the time synchronization, the time sync unit 202 transmits a sync communication response packet C to the terminal D104, in which the time sync information held by the time sync unit 202 is set (i.e., "100 msec" for the time sync period, "200 msec" for the slot time, "currently used slot 1" for the slot number, and "an elapsed time from start of the time sync period to immediately before transmission of the sync communication response packet in the terminal C" for the offset), and further, "terminal D" is set in the destination terminal ID field 301, "terminal C" is set in the source ID field 302, and "a value indicating that the terminal C has already established the time synchronization" is set in the status field 308.

When the communication monitor unit 205 of the terminal D104 receives the sync communication response packet C, the communication monitor unit 205 recognizes by the status field 308 that sync communication cannot be carried out, and notifies the time sync unit 202 of the terminal D of the time sync information included in the packet C. Then, the time sync unit 202 performs operation to establish time synchronization, on the basis of the time sync information notified from the communication monitor unit 205. That is, the terminal D104 calculates the start time of the next time sync period on the basis of the timing at which the sync communication response packet C is received, the time sync period in the time sync information included in the packet, and the offset value, and sets the time sync period timer 202a in the terminal D at the obtained timing. Thereby, the terminal D104 can establish time synchronization with the time t1 being the time sync period start position.

Accordingly, the time synchronization established by the terminal D104 becomes the same as that established among the terminals A101, B102, and C103, and further, the terminal D104 recognizes that the slot 1 is currently used. Therefore, when performing communication with another terminal after the establishment of the time synchronization, the terminal D104 performs this communication without using the currently used slot number, and therefore, the terminal D104 does not interfere with the sync communication performed between other terminals.

In the radio communication system, time synchronization is established among the terminals A~D by the above-mentioned procedure, and each of the respective terminals A~D including the hidden terminals secures a slot when performing communication to perform data transmission between terminals.

As described above, in the radio communication system according to the first embodiment of the present invention, each terminal establishes time synchronization between terminals on the basis of time sync information included in a sync communication response packet that is transmitted/received during communication between terminals or time sync information that is set in a sync communication request packet transmitted from each terminal, and when each terminal performs communication between terminals, the terminal forms a dummy slot on the basis of the shared time sync information, and a slot to which the dummy slot is assigned is secured for communication between terminals. Therefore, even when the construction of a radio network wherein no control station exists is dynamically altered, it is possible to reduce effects of hidden terminals while sharing a communication medium among terminals to ensure throughput.

While in this first embodiment the process of establishing time synchronization on the basis of a sync communication request packet and a sync communication response packet has been described, it is possible to establish time synchronization with a terminal which cannot receive the sync communication request packet and the sync communication response packet by including the time sync information in the sync communication data.

Embodiment 2

In the first embodiment of the invention, since, when performing sync communication, each other cannot know the slots which are currently used by all of the terminals existing in the network, collision of communications might be caused by that plural terminals use the same slot. This second embodiment of the invention relates to a communication control method in which, when performing sync communication between terminals in the radio network, collision of sync communications due to redundant use of the same slot in the network is prevented to ensure throughput between terminals with higher reliability.

Figure 6:
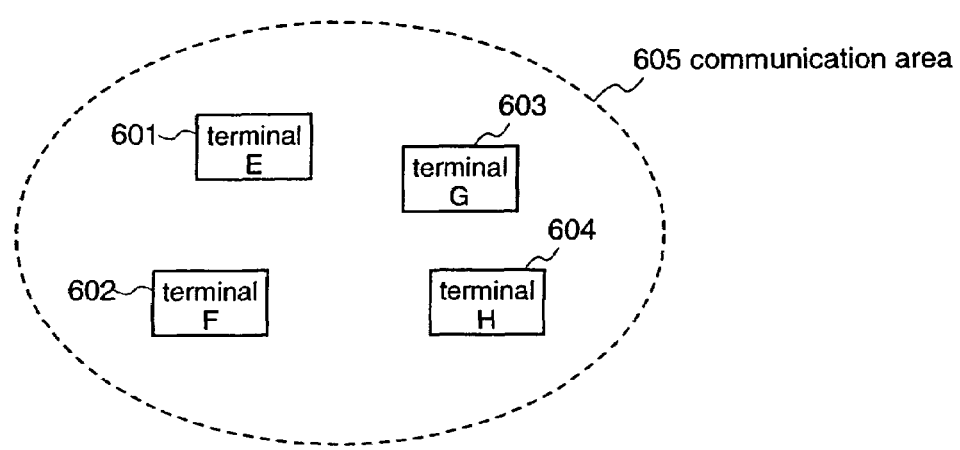
FIG. 6 is a diagram illustrating an arrangement of terminals which are communication control apparatuses according to a second embodiment.

FIG. 6 is a diagram illustrating arrangement of terminals each having a communication control apparatus according to the second embodiment. In FIG. 6, reference numerals 601~604 denote terminals having specific IDs, terminal E, terminal F, terminal G, and terminal H, respectively. The terminals E601, F602, G603, and H604 are distributed on the same space as a communication medium. A dotted line 605 in FIG. 6 shows a common communication area of the terminals 601~604. Since the respective terminals E601~H604 can directly communicate with all of the other terminals, no hidden terminals exist as shown in FIG. 6.

The communication control method according to the second embodiment adopts an access scheme to the communication medium in which the respective terminals perform communication, considering the effects to the other neighboring terminals.

Figure 7:
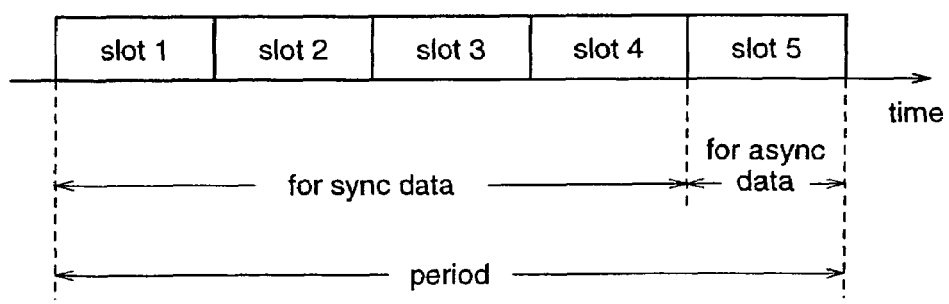
FIG. 7 is a diagram illustrating the construction of an access control period by time-division multiplexing according to the second embodiment.

FIG. 7 is a diagram illustrating the construction of an access control period according to a time division multiplexing method according to the second embodiment of the invention. With reference to FIG. 7, in this second embodiment, four sync slots and one async slot are arranged, and time division multiplexing method is realized by periodically repeating this arrangement. The async slot is the final slot within the period.

Further, in this second embodiment, like the first embodiment, each slot is given a conceptional number, and specifically, the first slot in the period is denoted as "slot 1". The following slots are given serial numbers that are incremented 1 by 1 in the time axis direction, regardless of whether the slots are sync slots or async slots. A slot next to the final slot 5 in the period, i.e., the first slot in the next period, is given the number of "slot 1" again, and serial numbers that are incremented 1 by 1 in the time axis direction are set from the next slot.

Since the access method or parameters relating to the time division multiplexing method are set conveniently, the present invention is not restricted thereto. Further, while in the above description the constructions of the sync slots and async slot within the period have already been determined, the construction within the period may be dynamically variable according to negotiations with other terminals.

Next, a description will be given of the construction of a packet to be transmitted/received between the respective terminals E601~H604.

In this second embodiment, in order to realize, by the time division multiplexing method, access control for an arbitrary terminal existing in the communication network, each of the respective terminals E601~H604 distributes a slot information communication packet including slot information that indicates the status of use a slot as a communication time unit, during stationary operation, at an arbitrary timing, to all of the other terminals which are located in positions to which the self-terminal can make direct communication. Further, each terminal distributes a data packet including data during sync communication of data.

In this second embodiment, every time each terminal receives the slot information from another terminal, the terminal manages the slot use statuses of all of the plural terminals existing in the network, including the received slot information, in association with the IDs of the respective terminals.

When each terminal performs sync communication of data, the terminal detects an empty slot that is usable for the sync communication, on the basis of the slot use statuses of the plural terminals which are managed at the terminal which starts data communication (hereinafter referred to as "data communication start side terminal").

Thereby, even when there is no control station, it is possible to prevent another terminal from using the same slot as the slot that is used for data communication between arbitrary terminals. As a result, the communication band for the data communication can always be ensured.

Figure 8:
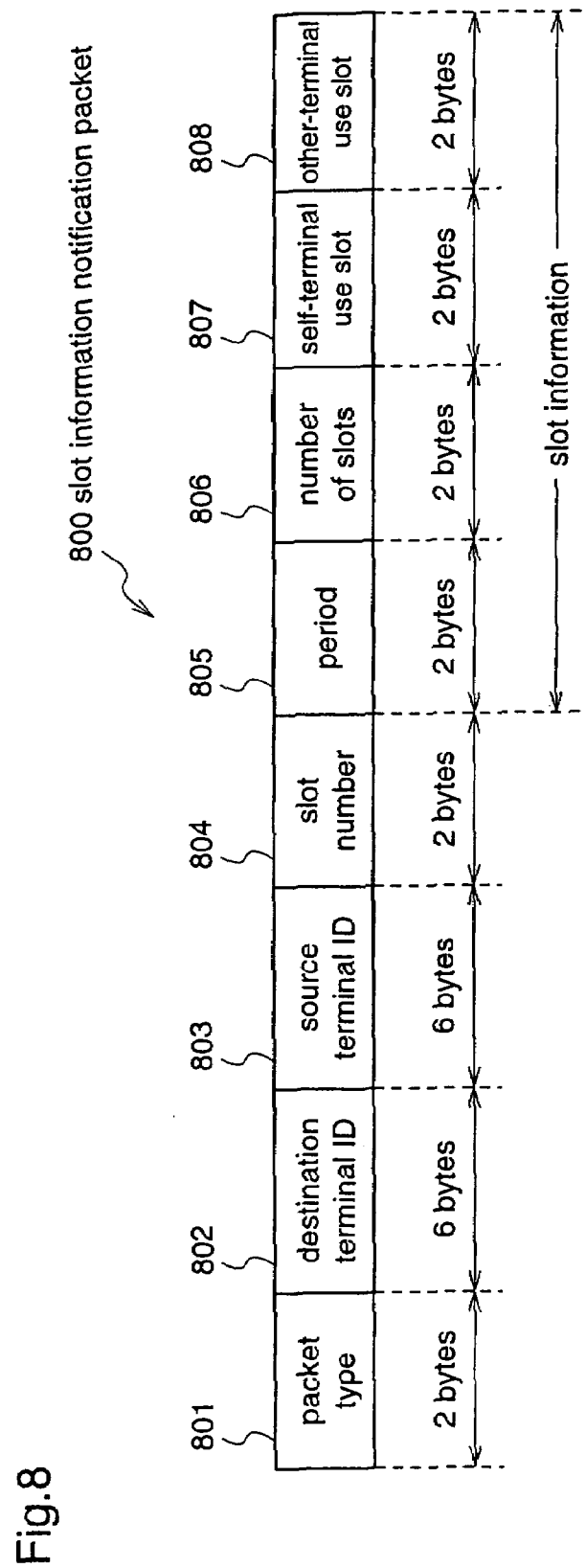
FIG. 8 is a diagram illustrating the construction of a slot information notification packet according to the second embodiment.

Initially, a slot information notification packet will be described. FIG. 8 is a diagram illustrating the construction of a slot information notification packet including slot information. In FIG. 8, the slot information notification packet 8 includes slot information that is necessary for realizing access control using the time division multiplexing method.

The packet construction is divided into fields depending on the contents, and includes, for example, a packet, type field 801, a destination terminal ID field 802, a source terminal ID field 803, a slot number field 804, a period field 805, a number-of-slots field 806, a self-terminal use slot field 807, and an other-terminal use slot field 809.

The packet type field 801 is a field for identifying the type of the packet, i.e., the slot information packet, the destination terminal ID field 802 is an address field indicating the destination terminal, the source terminal ID field 803 is an address field indicating the source terminal, and the slot number field 804 is a field indicating the slot number at which the slot information notification packet is transmitted from the source terminal. The period field 805 is a field indicating period information in time division multiplexing, and the number-of-slots field 806 is a field indicating the number of slots in time division multiplexing. The self-terminal use slot field 807 is a field indicating the slot number each terminal uses for itself, and the other-terminal use slot field 808 is a field indicating the slot number a terminal other than the self-terminal uses. The self-terminal use slot field 807 and the other-terminal use slot field 808 will be described later. The slot information is composed of the period 305, the number of slots 306, the self-terminal use slot 307, and the other-terminal use slot 308.

In FIG. 8, convenient lengths of the respective information included in the slot information notification packet 800 are shown. The packet type field 801 is 2 bytes, the destination terminal ID field 802 is 6 bytes, the source terminal ID field 803 is 6 bytes, and each of the slot number field 804, the period field 805, the number-of-slots field 806, the self-terminal use slot field 807, and the other-terminal use slot field 808 is 2 bytes.

The lengths of the respective fields relating to the slot information such as the period field 805, the number-of-slots field 806, the self-terminal use slot field 807, and the other-terminal use slot field 808b may be changed according to the parameters of access control by the time division multiplexing method. Further, the lengths of the respective fields described above are conveniently set, and therefore, the present invention is not restricted thereto.

Now, a description will be given of the self-terminal use slot field 807 and the other-terminal use slot field 808 in detail. The slots used by the respective terminals are set in the self-terminal use slot field 807 and the other-terminal use slot field 808 in detail.

To be specific, the slot number used by the self-terminal is set in the self-terminal use slot field 807, and the slot number used by another terminal than the self-terminal is set in the other-terminal use slot field 808.

In this second embodiment, the slot number used by the self-terminal or the other terminal is mapped to the respective bits of 2 bytes indicating the self-terminal use slot field 807 or the other-terminal use slot field 808, respectively, thereby notifying the slot used by each terminal.

For example, when the self-terminal uses the slot number 1, the bit number 0 of the self-terminal use slot field 807 is set to "1" ("00000000 00000001"). When another terminal located in the vicinity of the self-terminal uses the slot number 2, the bit number 1 of the other-terminal use slot field 808 is set to "1" ("00000000 00000010"). The method of expressing the self-terminal use slot field or the other-terminal use slot field is not restricted to that mentioned above, and any method may be used so long as the use statuses of each terminal and each slot are clarified.

Next, a description will be given of the construction of a data packet to be sync transmitted between terminals.

Figure 9:
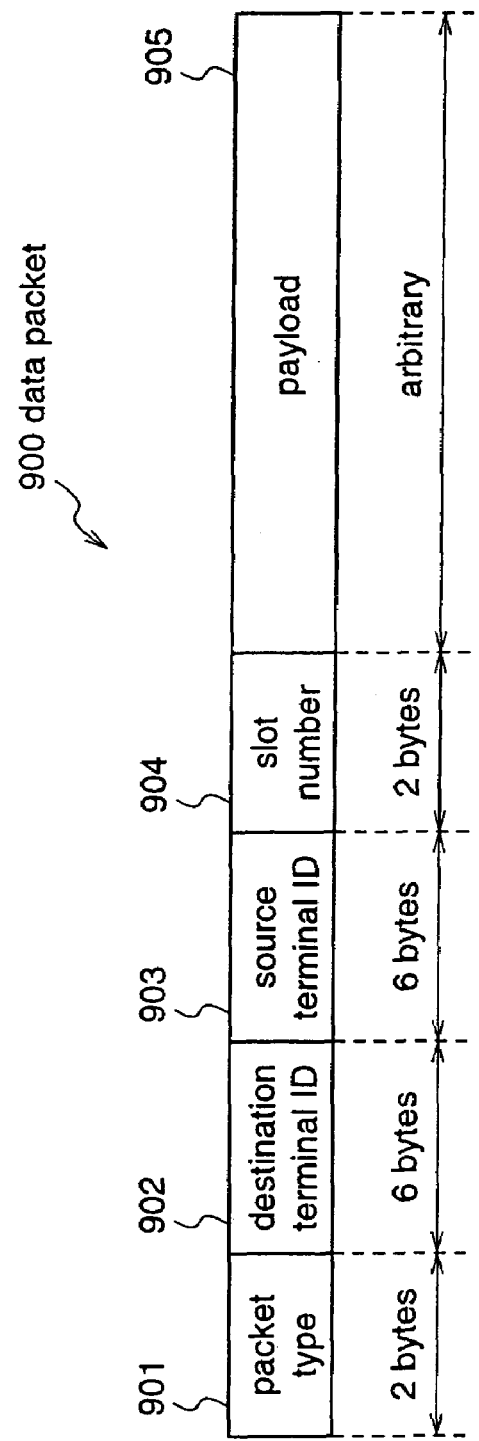
FIG. 9 is a diagram illustrating the construction of a data packet according to the second embodiment.

FIG. 9 is a diagram illustrating the construction of a data packet 900 comprising data. In FIG. 9, the data packet 900 comprises a packet type field 901, a destination terminal ID field 902, a source terminal ID field 903, a slot number field 904, and a payload.

The packet type field 901 is a field for identifying the type of the packet, i.e., the data packet, the destination terminal ID field 902 is an address field indicating the destination terminal, and the source terminal ID field 903 is an address field indicating the source terminal. The slot number field 904 is a field indicating the slot number in which the data packet is transmitted from the source terminal, and the data itself to be transmitted/received is set in the payload 905. Further, in FIG. 9, convenient lengths of the respective information included in the data packet 900 are shown. The packet type field 901 is 2 bytes, the destination terminal ID field 902 is 6 bytes, the source terminal ID field 903 is 6 bytes, the slot number field 904 is 2 bytes, and the payload 905 has an arbitrary length longer than 0 byte. The lengths of the respective fields described above are conveniently set, and therefore, the present invention is not restricted thereto.

Furthermore, in this second embodiment, as a procedure for obtaining a sync slot to be used when performing the above-mentioned data communication, data communication is carried out using the sync slot after exchanging a slot communication confirmation request packet and a slot communication confirmation response packet between the data communication start terminal and the data communication response terminal, data communication is carried out using the sync slot. Further, when the data communication according to the sync communication is ended, the data communication start terminal sends a slot release packet to the data communication response terminal to release the obtained slot.

The slot communication confirmation request packet and the slot communication confirmation response packet are packets different from the slot information notification packet 800 and the data packet 900, and each of these packets has slot information required for communication, in addition to the packet type field, the destination terminal ID field, and the source terminal ID field. Further, the slot communication confirmation request packet has information indicating a slot number to be obtained in addition to the above-mentioned information, and the slot communication confirmation response packet as information indicating the result to the acquisition request.

The slot acquisition procedure and the slot release procedure are not restricted to those mentioned above. Any procedure and packet construction may be used so long as slot communication can be recognized between the data communication start terminal and the data communication response terminal, or at terminals positioned in the vicinity of these terminals.

Next, a description is given of the construction of a communication control apparatus included in each terminal, according to the second embodiment.

Figure 10:
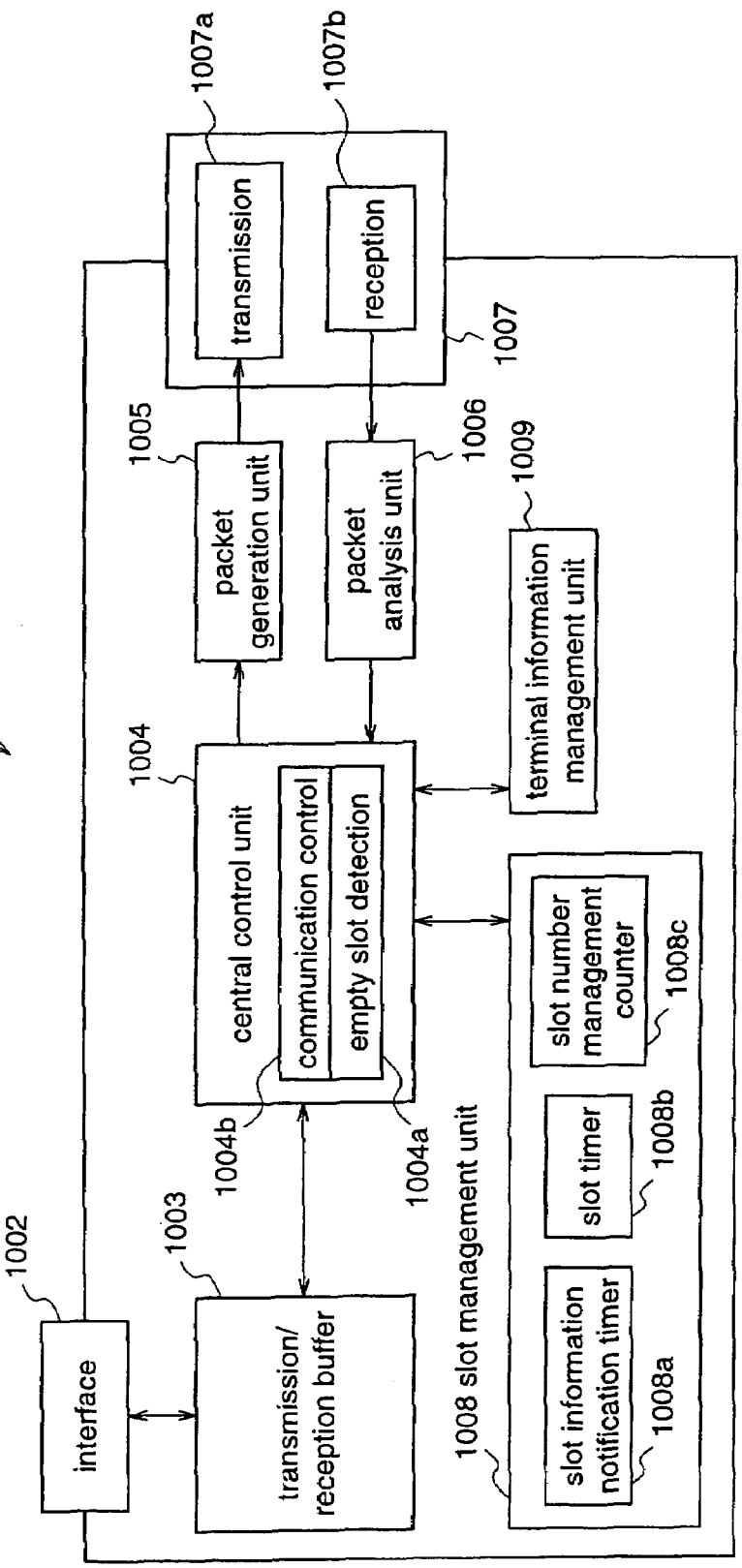
FIG. 10 is a block diagram illustrating the construction of a communication control apparatus according to the second embodiment.

FIG. 10 is a block diagram illustrating the construction of the communication control apparatus according to the second embodiment. The communication control apparatus 1001 shown in FIG. 10 shows the construction of a part for controlling packet communication included in each of the terminals E601~H604 shown in FIG. 6. The communication control apparatus 1001 comprises an interface 1002, a transmission/reception buffer 1003, a central control unit 1004, a packet generation unit 1005, a packet analysis unit 1006, a communication unit 1007, a slot management unit 1008, and a terminal information management unit 1009.

The interface 1002 performs exchange of various kinds of information between equipment (not shown) connected to the communication control apparatus 1001 and the transmission/reception buffer 1003. The equipment connected to the communication control apparatus 1001 is, for example, PC and AV equipment, and the information to be exchanged is, for example, digitized sync data such as a moving picture signal or an audio signal.

The communication unit 1007 is connected to a space as a communication medium to perform transmission and reception of data. The communication unit 1007 has a transmission part 1007a and a reception part 1007b physically or logically, to perform transmission and reception of data, respectively. The communication unit 1007 is, for example, IEEE 802.11b or Blue tooth.

The transmission/reception buffer 1003 is used for temporarily holding the data received from the equipment (not shown) connected to the communication control apparatus 1001 through the interface 1002, the transmission data generated in the communication control apparatus 1001, and the data received from the communication unit 1007.

The terminal information management unit 1009 manages all of the slot information of the plural terminals in the network including the slot information received from another terminal at an arbitrary timing, in association with the terminal IDs of the respective terminals. Thereby, it is possible to manage the slot information while updating the slot use statuses in all of the terminals existing in the communication network. The terminal information management unit 509 may manage not only the slot information but also information relating to the packet communication state, such as the number of packets transmitted and received, the number of packet errors, and the like.

The packet generation unit 1005 adds additional information for the communication control apparatus 1001 to the data transmitted through a transmission part 1007a of the communication unit 1007. For example, when transmitting the data packet 900, the packet generation unit 1005 sets the packet type field 901, the destination terminal ID field 902, the source terminal ID field 903, the slot number field 904, and the payload 905 to packetize the data to be transmitted.

The packet analysis unit 1006 analyzes the contents of the packet received through the reception part 1007b in the communication unit 1007, and extracts necessary information from the packet. For example, when the packet analysis unit 1006 receives the slot information notification packet 800 shown in FIG. 8, initially, it confirms that the received packet is the slot information notification packet from the packet type field 801, and extracts, from the packet, the destination terminal ID field 802, the source terminal ID field 803, the slot number field 804, the period field 805, the number-of-slots field 806, the self-terminal use slot field 807, and the other-terminal use slot field 808, and thereafter, sets the slot information (i.e., the period field 805, the number-of-slots field 806, the self-terminal use slot field 807, and the other-terminal use slot field 808) through the central control unit 1004 to the terminal information management unit 1009 and the slot management unit 1008. Further, when receiving the data packet 900 shown in FIG. 9, initially, the packet analysis unit 1006 confirms that the received packet is the data packet from the packet type field 901, and extracts the information from the destination terminal ID field 902, the source terminal ID field 903, the slot number field 904, and the payload 9.05 which are included in the packet, and thereafter, sets the data through the central control unit 1004 to the transmission/reception buffer 1003.

The slot management unit 108 includes a slot information notification timer 1008a, a slot timer 1008b, and a slot number management counter 1008c, and autonomously updates the current slot number. To be specific, when the slot timer 1008b terminates, the slot number management counter 508c is incremented to update the slot number at the current time. When the slot number is incremented to the last slot number (slot 5), updation of the slot number is performed from the first value (slot 1). The length of the slot timer 1008b is a value obtained by diving the value of the period field 805 in the slot information by the value of the number-of-slots field 1006.

When the slot number management counter 1008c indicates a slot number which is obtained by the self-terminal and enables communication, data transmission is appealed to the central control unit 1004. On the other hand, when receiving a packet including slot information, such as the slot information notification packet 800, from the central control unit 504, the termination timing of the slot timer 1008b is corrected.

Further, when the slot information notification timer 1008a has expired, this timer appeals the central control unit 1004 to set the slot information of the self-terminal in the slot information notification packet 800, and start transmission. The length of the slot information notification timer 1008a is arbitrarily set.

The central control unit 1004 includes a communication control part 1004a for performing the processes in the successive data communication of the entire communication control apparatus 1001, and the processes in time division multiplexing, and an empty slot detection part 1004a for detecting an empty slot.

The functional components of the communication control apparatus 1001, i.e., the interface 1002, the transmission/reception buffer 1003, the central control unit 1004, the packet generation unit 1005, the packet analysis unit 1006, the communication unit 1007, the slot management unit 1008, and the terminal information management unit 1009, may be connected as hardware to the central control unit 1004, or these components may be implemented as a program that can be read and executed by the central control unit 1004.

Next, the operation of the communication control apparatus 1001 will be described. In this second embodiment, it is assumed that the slot information notification packet 800 should be transmitted immediately after the slot number is changed (i.e., at the start timing of each slot). Thereby, the reception terminal side can determine that the timing at which it receives the slot information notification packet 800 is the slot start position, and can obtain the current slot number from the information held in the slot number field 804 in the slot information notification packet 800, thereby realizing access control by the time division multiplexing between terminals. Further, when the slot information notification packet 800 is provided with a time offset from the slot start position, it is possible to realize access control by the time division multiplexing between terminals even when the packet 800 is transmitted/received at a timing other than the slot start timing. The method for realizing access control by the time division multiplexing between terminals is not restricted to that mentioned above, and any method may be employed so long as the slot start timing can be shared between terminals.

Further, it is assumed that, in the second embodiment, the interval of transmission of the slot information notification packet 800, the slot period, and the number of slots, which are stored in the slot management unit 1008, are 3000 msec, 100 msec, and five, respectively, and as shown in FIG. 8, the slots 1 to 4 are sync slots and the slot 5 is an async slot.

The above-mentioned parameters for realizing the time division multiplexing method, i.e., the transmission interval of the slot information notification packet, the slot period, the number of slots, and the like, are parameters which depend on the packet communication status, the processing time for transmission/reception in the communication control apparatus 1001, and the timer accuracy required of the communication control apparatus 1001, and therefore, the present invention is not restricted thereto.

Furthermore, since the asynchronously generated packet is transmitted to each terminal using an arbitrary async slot, the slot information notification packet 800 is transmitted using the slot 5 in this second embodiment. However, the slot information notification packet 800 can be considered as sync data that is periodically transmitted, and therefore, it may be transmitted in an unused sync slot or a sync slot that is obtained by the self-terminal.

Figure 11:
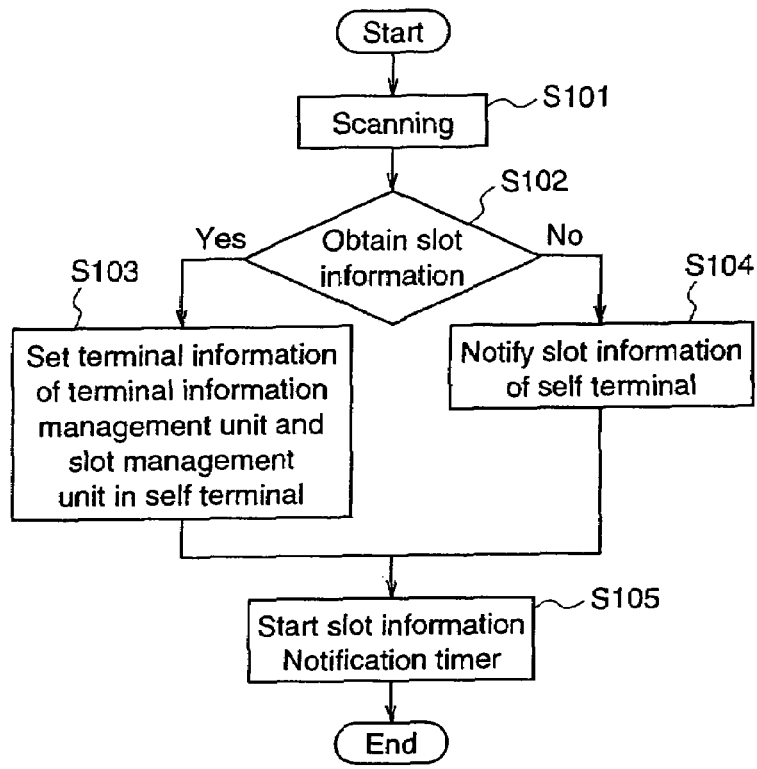
Figure 11:
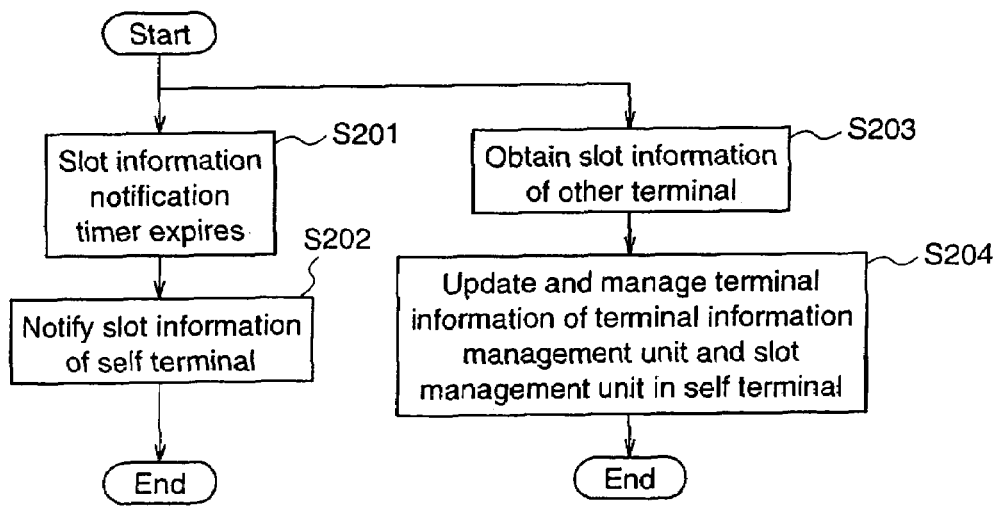

Initially, the operation of terminals for realizing the time division multiplexing access method will be described using flowcharts shown in FIGS. 11(*a*) and 11(*b*). This operation is controlled by the communication control part 1004a of the central control unit 1004. FIG. 11(*a*) shows the initial operation of a terminal immediately after power-on or reset, and FIG. 11(*b*) shows the stationary operation other than the initial state.

With reference to FIG. 11(*a*), the terminal in the initial state immediately after power-on or reset performs scanning (step S101) to collect information of another terminal in the vicinity of the terminal. The scanning is an operation for collecting a packet transmitted from the neighboring other terminal, and obtaining information relating to the communication network from the packet (e.g., the slot information for realizing time division multiplexing).

When the slot information can be obtained as a result of the scanning (step S102), the various parameters included in the obtained slot information are extracted, and then the information stored in the terminal information management unit 1009 and the slot management unit 1008 of the self-terminal are updated and managed (step S103), and thereafter, the slot information notification timer 1008a in the slot management unit 1008 is started to start access control by the time division multiplexing method (step S105).

When the slot information cannot be obtained in step S102, it is determined that no neighboring terminal exists at the current time, and the slot information possessed by the self-terminal is informed to another terminal (step S104). Then, the slot information notification timer 1008a in the slot management unit 1008 is started to start access control by the time division multiplexing method (step S105). The slot information acquisition operation after the scanning should be performed for a period longer than the transmission interval (3000 msec) of the slot information notification packet which is stored in the slot management unit 1008.

When, in the terminal during the stationary operation other than the above-mentioned initial state, the slot information notification timer 1008a in the slot management unit 1008 has expired as shown in FIG. 11(*b*) (S201), the information relating to time division multiplexing is obtained from the slot management unit 1008 of the self-terminal and set in the slot information notification packet 800, and it is transmitted immediately after start of the next async slot (slot 5) (step S202). If the timing at which the slot number is changed to a slot number that can be used by the self-terminal is equal to the timing at which the slot information notification timer 1008a expires, the slot information notification packet 800 may be transmitted immediately after the termination of the slot information notification timer 1008a.

On the other hand, when the terminal receives slot information from another terminal during the stationary operation (S203), various kinds of parameters are extracted from the slot information, and the information stored in the terminal information management unit 1009 and the slot management unit 1008 of the self-terminal are updated to be remanaged (step S204). Every time the terminal obtains the slot information from another terminal, it updates and manages the information stored in the terminal information management unit 1009 and the slot management unit 1008, thereby autonomously avoiding mismatch of slot information between terminals.

While in the above description the scanning is carried out in the initial state immediately after power-on or reset, the scanning may be periodically repeated even during the stationary operation other than the initial state. In this case, the respective terminals can periodically exchange the slot information, thereby preventing mismatch of the slot information between the terminals. Further, in the above description, conversely, the slot information of the self-terminal is informed every time the slot information notification timer 1008a expires during the stationary operation. However, even when, in a certain terminal, the slot information notification timer 1008a expires within the same period as the slot in which the terminal receives a slot information notification packet 800 from another terminal, the terminal may not transmit the slot information notification packet 800 from the self-terminal. In this case, an increase in traffic between the terminals can be restricted.

Figure 12:
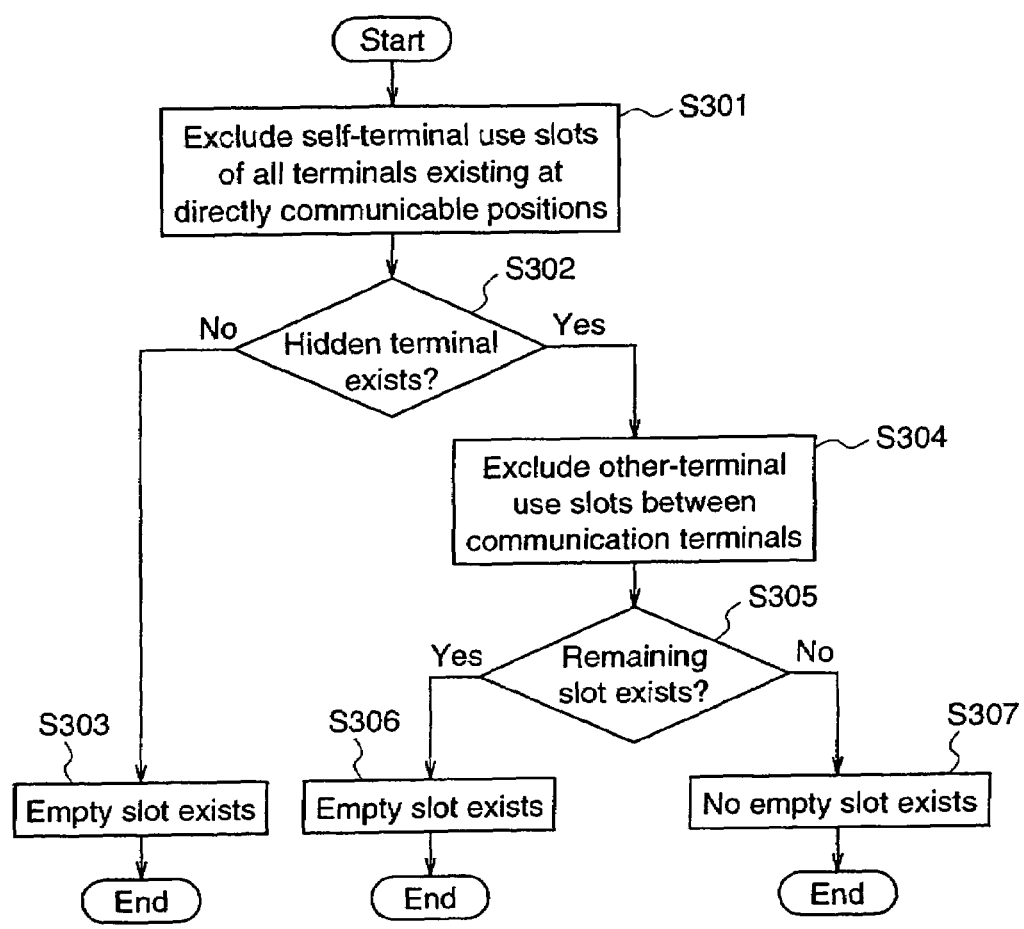
FIG. 12 is a flowchart illustrating an empty slot detecting operation by the communication control method according to the second embodiment.

Next, a description will be given of the operation of terminals for detecting an empty slot in the communication control method, with reference to a flowchart of FIG. 12. This operation is carried out by the data transmission start side terminal before starting data communication, and the control thereof is performed by an empty slot detection part 1004b in the central control unit 1004 of the terminal.

Initially, on the basis of the information of plural terminals which is managed by the terminal information management unit 1009 of the terminal at the data communication start side, the slots used by all of the terminals which can directly communicate with the data communication start side terminal, i.e., the self-terminal use slots, are excluded from the slots 1 to 5 (step S301).

Next, detection of hidden terminal is carried out (step S302). In the network having no hidden terminal, the slots remaining at this point in time are determined as empty slots (step S303).

On the other hand, if a hidden terminal exists in the communication network, the other-terminal use slot of the terminal which responds to data communication (hereinafter referred to as "data communication response side terminal") is further removed (step S304). At this time, if there is a remaining slot (step S304), this slot is regarded as an empty slot (step S306). If there is no remaining slot (step S305), it is determined that there is no empty slot (step S307).

The hidden terminal detection method employed in step S302 is not specifically mentioned in this second embodiment, but well known methods as follows may be employed: a method of determining that there is a hidden terminal when only either a request packet or a response packet is received in a packet exchanging sequence; and a method of determining that there is a hidden terminal when the notified slot number is other than the slot number which is directly used by the other-terminal use slot of the slot information notification packet transmitted by another terminal.

While the above-mentioned empty slot detection method determines whether a hidden terminal exists in the communication network or not, the present invention is not restricted thereto. For example, without determining whether a hidden terminal exists or not, all of the self-terminal use slots and the other-terminal use slots of all terminals which can directly communicate with the data communication start side terminal are removed from the all slots 1 to 5, and a remaining slot, if any, is regarded as an empty slot, while it is determined that there is no empty slot when there is no remaining slot.

Hereinafter, a description will be given of the operation sequence between terminals with reference to FIGS. 13 and 14.

Figure 13:
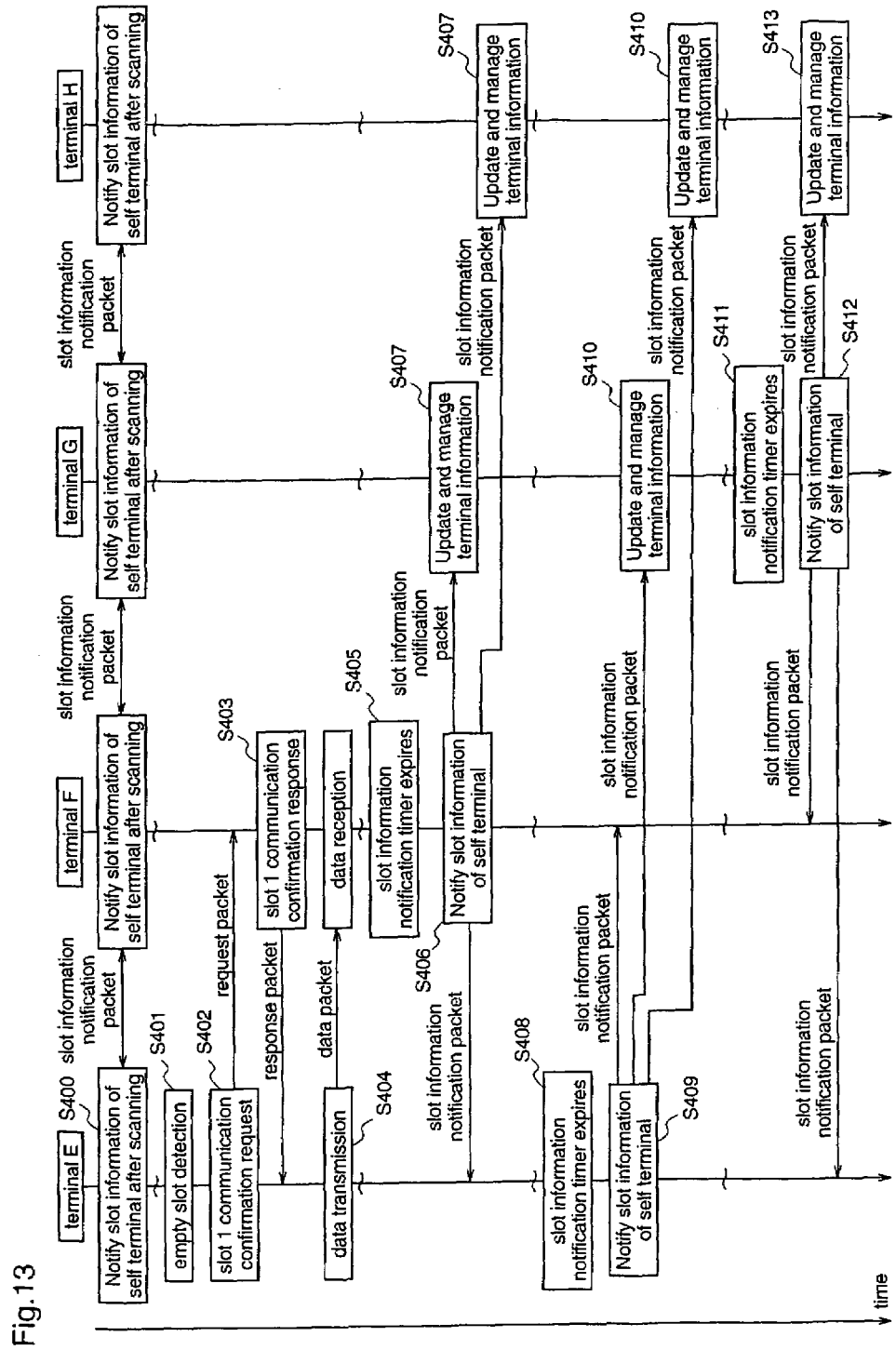
FIG. 13 is a diagram illustrating a sync slot acquisition procedure according to the second embodiment.

FIG. 13 is a sequence diagram illustrating the sync data communication procedure according to the second embodiment. In FIG. 13, it is assumed that time passes downwards, and a source terminal and a destination terminal are expressed by arrows in the horizontal direction when communication is carried out between terminals, and further, the names of packets and the names of events are indicates with the arrows in the horizontal direction. FIGS. 14(*a*)-14(*e*) are diagrams illustrating the slot information managed by the terminal information management unit in a terminal at different points in time, in the sync data communication procedure shown in FIG. 13.

(Step S400)

A terminal which starts to operate first (e.g., a terminal which is powered on first) performs scanning, but cannot obtain slot information of other terminals because other terminals are not operated yet, and therefore, this terminal transmits a slot information notification packet 800 to notify slot information of the self-terminal as shown in FIG. 11(*a*). Thereafter, the other terminals, which have started to operate successively, set the slot information obtained by scanning in the terminal information of the terminal information management unit 1009 and the slot management unit 1008 in the self-terminal.

The terminal that has started operation first and the terminals that have successively started operations thereafter start their slot information notification timers 1008a to start access controls by the time division multiplexing method, respectively. Thereafter, the respective terminals perform stationary operations as shown in FIG. 11(*b*). Although, in FIG. 13, the slot information communication packet 800 is shown as if it is exchanged between adjacent terminals, the slot information notification packet 800 outputted from a terminal is transmitted to all of the other terminals because there is no hidden terminal in the network construction shown in FIG. 6.

It is assumed that, from the state where no terminals perform sync communication, the terminal E and the terminal F start sync communication using a sync slot. Hereinafter, the operation sequence between the terminals E and F will be described.

At this point in time, there is no hidden terminal in the slot information of all of the plural terminals managed by the terminal information management unit 1009 in the both terminals E and F, and all of the terminals including the terminals E and F use no sync slot, and therefore, no slot number is displayed. FIG. 14(*a*) shows information managed by the terminal information management units 1009 in the terminals E and F at this point in time.

(Step S401)

The terminal E detects an empty slot to reverse a sync slot to be used for data communication with the terminal F.

Detection of an empty slot is performed as follows. That is, as shown in FIG. 14, the slots which are used by the terminals F to H themselves (self-terminal use slots) existing in the positions to which the terminal E can directly communicate are removed from the all slots 1 to 5, and thereafter, it is determined whether a hidden terminal exists or not. At this point in time, there is no slot to be removed because the respective terminals perform no sync communication, and further, no hidden terminal exists in this second embodiment, and therefore, it is determined that all slots are empty.

(Step S402)

Next, the terminal E transmits a slot communication confirmation request packet which requests sync communication to the terminal F using a slot. It is assumed that, among the empty slots, a slot of the smallest slot number is selected to be used for communication. Accordingly, the terminal E transmits a slot 1 communication confirmation request packet which requests sync communication using the slot 1, to the terminal F.

(Step S403)

On receipt of the slot 1 communication confirmation request packet, the terminal F confirms the slot information of all of the plural terminals stored in the terminal information management unit 1009 in the terminal F to check whether the slot 1 is empty or not. Since, as shown in FIG. 14(*a*), there are shown no slot numbers of self-terminal use slots nor other-terminal use slots in the slot information of all of the plural terminals which are managed by the terminal information management unit 1009 in the terminal F at this point in time, the terminal F determines that the slot 1 is empty, and returns a slot 1 communication recognition response packet indicating that sync communication using the slot 1 is possible, and then displays the slot 1 in the self-terminal use slots of the terminals E and F among the slot information of all of the plural terminals managed by the terminal information management unit 1009 in the terminal F. FIG. 14(*b*) is a diagram illustrating the information managed by the terminal information management unit 1009 in the terminal F.

(Step S404)

On receipt of the slot 1 communication recognition response packet, the terminal E performs updation management to display the slot 1 as a self-terminal use slot of the terminal E among the slot information of all of the plural terminals managed by the terminal information management unit 1009 in the terminal E, and performs data communication with the terminal F using the slot 1.

(Steps S405 and S406)

Thereafter, assuming that the slot information notification timer 1008*a* of the terminal F has expired before those of the other terminals, the terminal F transmits the slot information notification packet 800 shown in FIG. 8 to all of the other terminals E, G, and H. At this time, in the slot information notification packet 800 transmitted from the terminal F, "slot information notification packet indicating ID" is set in the packet type field 801, "broadcast terminal ID" indicating the all terminals is set in the destination terminal ID field 802, "ID of terminal F" is shown in the source terminal ID field 803, "slot 5" indicating an async slot is set in the slot number field 804, "100" indicating 100 msec is set in the period field 805, "5" is set in the number-of-slots field 306, "1" is set for the bit 0 and "0" is set for the other bits 1~15 in the self-terminal use slot field 807 ("00000000_00000001"), and "0" is set for the all bits 0~15 in the other-terminal use slot field 808 ("00000000_00000000").

(Step S407)

The slot information notification packet 800 transmitted from the terminal F is received by all of the other terminals E, G, and H, the respective terminals E, G, and H extract the various kinds of information from the above-mentioned slot information notification packet 800, and update and manage the information which is managed by the slot management units 1008 and the terminal information management units 1009 in the terminals E, G, and H. In the terminal E which performs sync communication of data with the terminal F using the slot 1, updation to new information and management thereof have already been done in the terminal information management unit 1009 in step S404, updation and management for the information is not carried out. On the other hand, the terminals H and G extract the information from the slot information notification packet 800 received from the terminal F, and displays the slot number 1 in the self-terminal use slot of the terminal F, among the slot information of all of the plural terminals managed by the terminal information management units 1009 of the terminals G and H. FIG. 14(*c*) is a diagram illustrating the information managed by the terminal information management units 1009 of the terminals G and H, respectively, at this point in time.

(Step S408~S410)

Thereafter, assuming that the slot information notification timer 1008*a* of the terminal E has expired, the terminal A transmits the same slot information notification packet 800 as that from the terminal F, to the terminals F~H. Then, among the terminals F, G, and H which have received the slot information notification packet 800 from the terminal E, the terminals G and H other than the terminal E and the terminal F performing sync communication using the slot 1 set the slot number 1 in the self-terminal use slot field of the terminal E in the terminal information management units 1009 of the respective terminals. FIG. 14(*d*) is a diagram illustrating the slot information managed by the terminal information management units 1009 of the terminals G and H at this point in time.

(Steps S411~S413)

Thereafter, assuming that the slot information notification timer 1008*a* of the terminal which does not perform sync information, i.e., the terminal G, has expired, the terminal G transmits the slot information notification packet 800 to all of the other terminals E, F, and H. In the slot information notification packet 800 transmitted from the terminal G at this time, "slot information notification packet indicating ID" is set in the packet type field 801, "broadcast terminal ID" indicating the all terminals is set in the destination terminal ID field 802, "ID of terminal G" is set in the source terminal ID field 803, "slot 5" indicating an async slot is set in the slot number field 804, "100" indicating 100 msec is set in the period field 805, "5" is set in the number-of-slots field 306, "0" is set for the all bits 0~15 in the self-terminal use slot field 807 ("00000000_00000000"), and "1" is set for bit 0 and "0" is set for the other bits 1~15 in the other-terminal use slot field 808 ("00000000_00000001").

Then, among the other terminals E, F, and H which receive the slot information notification packet 800 from the terminal G, the terminal H which is a terminal other than the terminals E and F performing sync communication using the slot 1 displays the slot number 1 in the other-terminal use slot field of the terminal G among all of the slot information of the plural terminals managed by the terminal information management unit 1009 of the terminal H. FIG. 14(*e*) shows the information managed by the terminal information management unit 1009 of the terminal H at this point in time. Since it is known from this display that the terminals other than the terminal G use the slot 1, if there exists a terminal that starts communication with the terminal G using the sync slot (e.g., terminal H), it is possible to select a slot other than the slot 1.

As described above, according to the second embodiment, the slot management unit 1008 and the terminal information management unit 1009 are included in the communication control apparatus 1001 possessed by each terminal, and each terminal outputs, at a predetermined arbitrary timing, slot information including the self-terminal use slot that is used by the self-terminal and the other-terminal use slot that is used by the terminals other than the self-terminal. Further, when each terminal receives the slot information from the other terminal, the information of the terminal information management unit of the self-terminal, including the received slot information, is updated and managed. Therefore, it is possible to prevent the plural terminals in the network wherein no control station exists from using the same slot redundantly, whereby time-division multiplexing connected among plural terminals can be efficiently realized.

In this second embodiment, each terminal updates and manages the information stored in the terminal information management unit 1009 of the terminal including the obtained slot information every time it obtains the slot information notification packet 800 outputted from another terminal. However, every time each terminal receives a slot communication confirmation request packet or a packet including slot information such as a slog communication confirmation response packet, the terminal may update and manage the information stored in the terminal information management unit 1009 including the information possessed by the request or response packet.

Further, in this second embodiment, when there are plural empty slots that are not being used, the empty slots are successively selected starting from the smallest slot number to be used for sync communication. However, the selection method is not restricted thereto. For example, the slots to be used for sync communication may be selected starting from the largest slot number or may be selected at random to avoid redundant selection between terminals, or the slots having less communication error due to communication circuiting condition may be selected.

Furthermore, in this second embodiment, the slot information is included in the slot information notification packet 800 to be transmitted to the respective terminals. However, the slot information may be may be set in a packet other than the slot information notification packet 800, such as the data packet 900, to be transmitted to the respective terminals. In this case, a terminal which could not receive the slot information notification packet 800 becomes able to collect the slot information by receiving another packet which is frequently transmitted and received to/from the terminal, other than the slot information notification packet 800, whereby mismatch of the slot information between terminals can be reliably avoided.

Furthermore, the packet constituents to be transmitted/received by the communication control method according to the second embodiment, such as the data packet 900 and the slot information notification packet 800, are not restricted to those mentioned above. For example, according to the communication condition or the data transmission accuracy that is required of the communication control apparatus according to the second embodiment, additional information as follows may be attached: a sequence number which is assigned every time data is transmitted and is used for controlling missing or ordering of packets at the data communication response side, a fragment number that is needed for dividing and bonding the data packet 900, an EDC code (Error Detecting Code) such as a CRC code (Cyclic Redundancy Check) that is an error detection code for detecting an error of data on the data communication response side, and an ECC code (Error Correcting Code) such as a Hamming code for correcting an error.

Furthermore, in this second embodiment, the information about the slot that is being used by the self-terminal is distributed as slot information expressing the slot use status. However, instead of the slot that is being used, information about an unused slot that is not being used may be distributed as the slot information. In this case, since any of the information about the slot that is being used and the information about the slot that is not being used may be described as slot information in the slot information notification packet 800, the terminal which receives this notification packet must distinguish between these slots. For example, which slot is to be used may be previously determined in the communication network, or another area may be prepared by increasing the packet length of the packet including the slot information, or an unused bit (e.g., the most significant bit) of each of the self-terminal use slot 808 and the other-terminal use slog 808 may be used.

Embodiment 3

Hereinafter, a description will be given of a third embodiment of the present invention in which unused slots that are not used by each terminal are displayed as slot information in the slot information notification packet 800. Further, in this third embodiment, it is assumed that hidden terminals exist.

Figure 15:
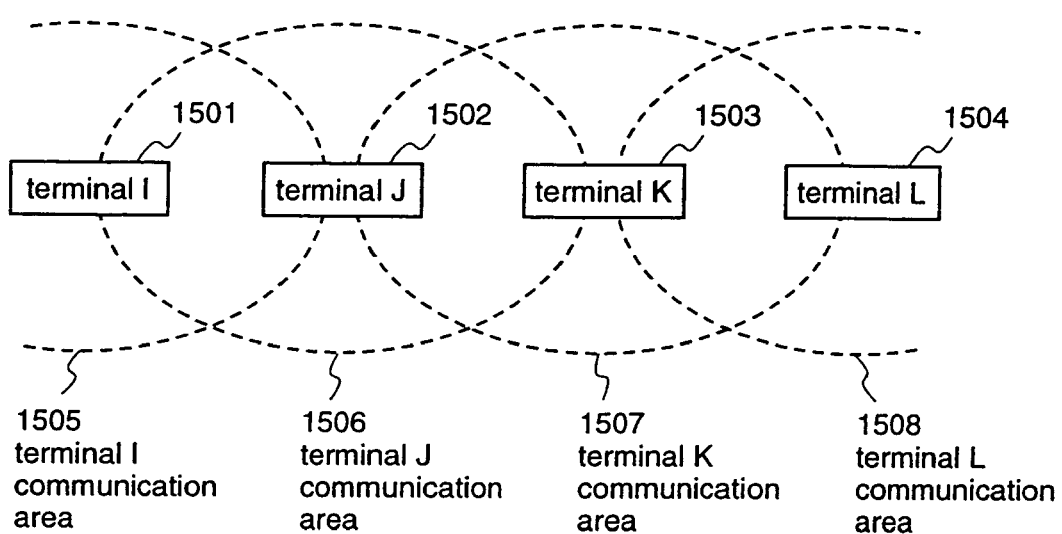
FIG. 15 is a diagram illustrating an arrangement of terminals which are communication control apparatuses according to a third embodiment of the present invention.

FIG. 15 is a diagram illustrating an arrangement of terminals (communication control apparatuses) according to the third embodiment of the present invention. In FIG. 15, reference numerals 1501~1504 are terminals having specific IDs, i.e., a terminal I, a terminal J, a terminal K, and a terminal L, respectively, and these terminals I1501~L1504 are distributed on the same space as a communication medium. In FIG. 15, dotted lines 1505~1508 show communication areas of the terminal I1504, the terminal J, the terminal K, and the terminal L, respectively. In contrast to the second embodiment, each terminal cannot directly communicate with all of other terminals in this third embodiment, and there exist hidden terminals corresponding to the respective terminals. More specifically, the terminal I1501 cannot directly communicate with the terminal K1503 and the terminal L1504, the terminal J1502 cannot directly communicate with the terminal L1504, the terminal K1503 cannot directly communicate with the terminal I1501, and the terminal L1504 cannot directly communicate with the terminal I1501 and the terminal J1502.

The access control method to the communication medium, the parameters relating to the sync slot, the construction of each packet (the slot information notification packet 800, the data packet 900, etc.) to be transmitted/receipt, and the construction of the communication control included in each terminal are identical to those of the second embodiment.

However, in this third embodiment, unused slots of the self and other terminals are displayed in the slot information notification packet 800. Accordingly, the slot information notification packet 8001 to be transmitted/received according to the third embodiment includes a self-terminal nonuse slot field 807' and an other-terminal nonuse slot field 808' instead of the self-terminal use slot field 807 and the other-terminal use slot field 808.

In this third embodiment, in order to indicate that unused slots are displayed in the slot information notification packet 800, the most significant bits of the self-terminal nonuse slot field 807' and the other-terminal nonuse slot field 808' are set to "1". The method of expressing the self-terminal and other-terminal nonuse slots is not restricted to that mentioned above. Any method may be employed as long as the nonuse status of the terminals and slots can be expressed.

However, the terminal information management unit 1009 does not manage unused slots of the self and other terminals in each terminal but manages used slots of the self and other terminals in each terminal, as in the second embodiment. In this way, even when the method for displaying the slot information in the packet is changed, the empty slot detection method described for the second embodiment can be utilized as long as the information display method to be used in the apparatus 1001 is unified among the plural terminals.

Figure 16:
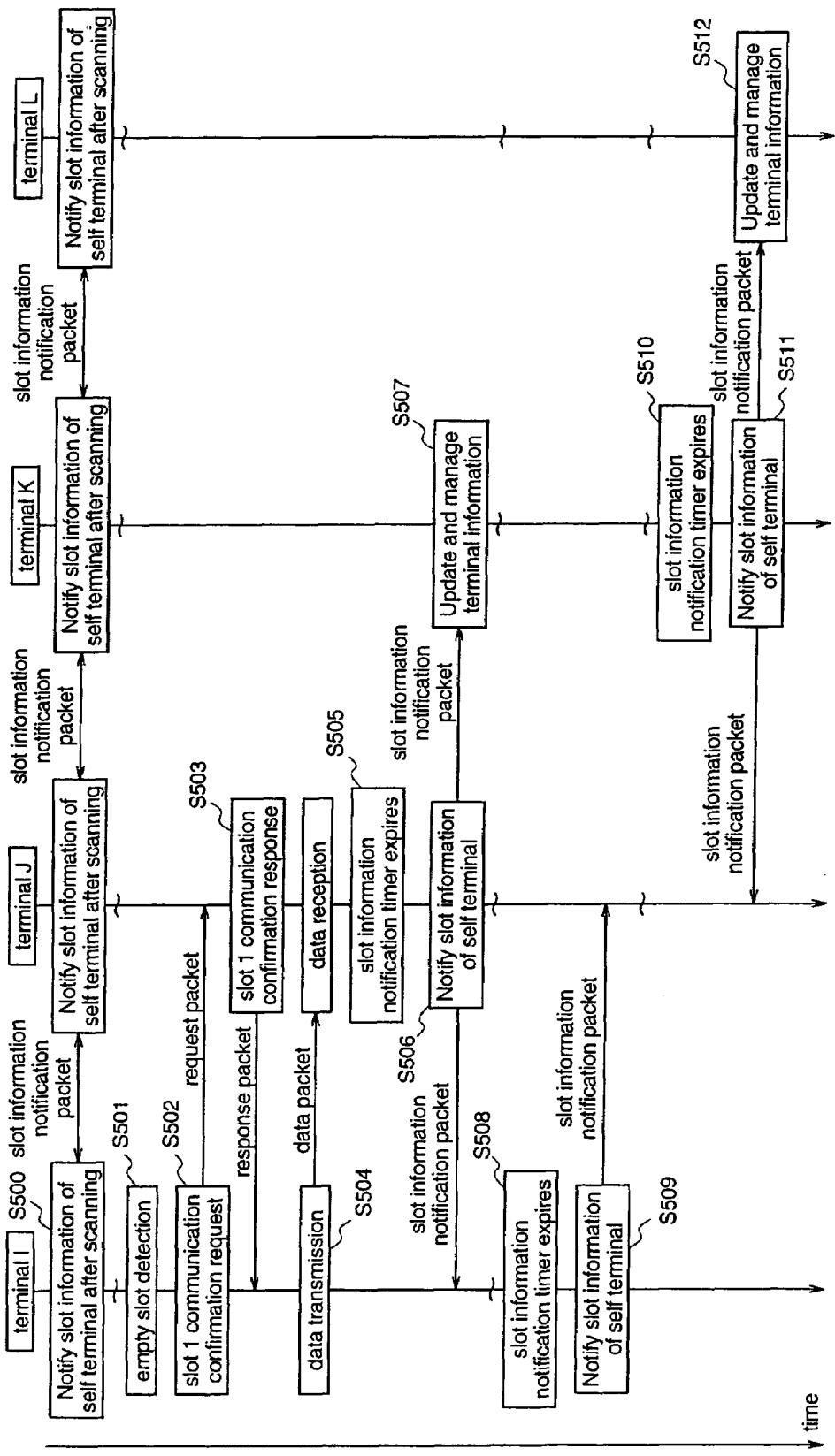
FIG. 16 is a diagram illustrating a sync slot acquisition procedure according to the third embodiment.
Figure 17:
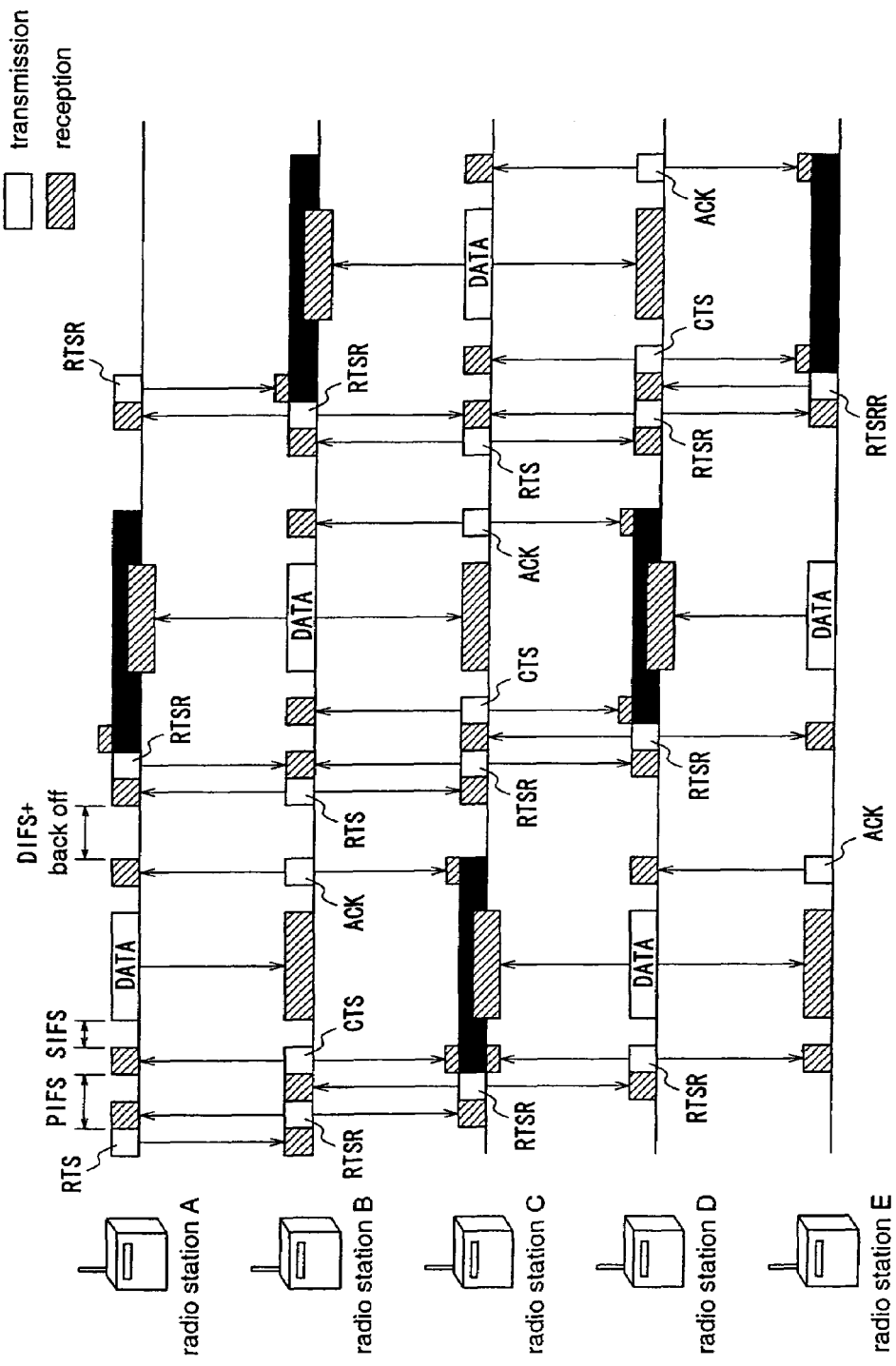
FIG. 17 is a diagram illustrating a data transmission sequence using RTS and CTS in the conventional radio communication system.
Figure 18:
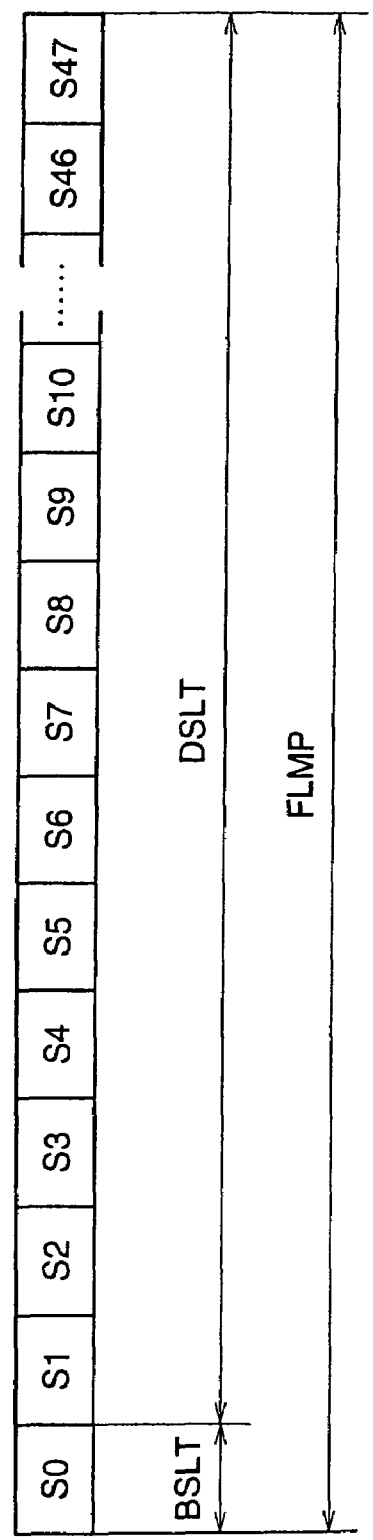
FIG. 18 is a diagram illustrating the construction of a frame period in which a beacon slot and data slots for receiving data are arranged, in the conventional communication method.

Hereinafter, the operation sequence between terminals according to the third embodiment will be described with reference to FIG. 16. In FIG. 16, it is assumed that time passes downwards, and a source terminal and a destination terminal are expressed by arrows in the horizontal direction when communication is carried out between terminals, and further, the names of packets and the names of events are indicates with the arrows in the horizontal direction.

(Step S500)

As in step S400 shown in FIG. 13, the respective terminals exchange the slot information notification packets to start time-division multiplexing system access control.

It is assumed that, in the state where the respective terminals are performing no sync communication, sync communication is started between the terminal I and the terminal J using a sync slot. Hereinafter, the operation sequence between the terminals I and J will be described.

There is no indication of slot number in the slot information of all of the plural terminals managed by the terminal information management units 1009 in the terminals I and J at this point in time, because all of the terminals including the terminals I and J use no sync slot.

(Step S501)

The terminal I performs detection of an empty slot to reverse a sync slot to be used for data communication with the terminal J.

In order to detect an empty slot, it is determined whether a hidden terminal exists or not, after removing, from all slots, the self-terminal use slots of all terminals to which the terminal I can directly communicate. In this third embodiment, although hidden terminals exist, since the self-terminal and the neighboring other terminals use no sync slot, it is determined that all slots are empty.

(Step S502)

Next, the terminal I transmits a slot communication confirmation request packet that requests sync communication to the terminal J. As in the second embodiment, among the empty slots, an empty slot having the smallest slot number is selected to be used for sync communication. Accordingly, the terminal I transmits a slot 1 communication confirmation request packet that requests sync communication using the slot 1, to the terminal J.

(Step S503)

On receipt of the slot 1 communication confirmation request packet, the terminal J confirms the slot information of all of the plural terminals stored in the terminal information management unit 1009 of the terminal J to check whether the slot 1 is empty or not. There is no slot number in the slot information of all of the plural terminals managed by the terminal information management unit 1009 of the terminal J at this point in time. Accordingly, the terminal J determines that the slot 1 is empty, and returns a slot 1 communication confirmation response packet indicating that sync communication using the slot 1 is possible, and displays "slot 1" in the self-terminal use slots of the terminals I and J, among the slot information of all of the plural terminals managed by the terminal information management unit 1009 of the terminal J.

(Step S504)

On receipt of the slot 1 communication confirmation response packet, the terminal I performs updation, i.e., displays "slot 1" in the self-terminal use slot of the terminal I, among the slot information of all of the plural terminals managed by the terminal information management unit 1009 of the terminal I, and thereafter, performs data communication with the terminal J using the slot 1.

(Steps S505 and S506)

Thereafter, assuming that the slot information notification timer 1008*a* of the terminal J has expired, the terminal J transmits a slot information notification packet 800' to all terminals (terminals I and K) existing in the communication area 1506 of the terminal J. In the slot information notification packet 800' to be transmitted from the terminal J, "slot information notification packet indicating ID" is set in the packet type field 801, "broadcast terminal ID" indicating the all terminals is set in the destination terminal ID field 802, "ID of terminal J" is set in the source terminal ID field 803, "slot 5" indicating an async slot is set in the slot number field 804, "100" indicating 100 msec is set in the period field 805, "5" is set in the number-of-slots field 306, "1" is set for the bits 1, 2, 3 and the most significant bit 15 and "0" is set for the other bits in the self-terminal nonuse slot 307' ("10000000_00001110"), and "1" is set for the bits 0, 1, 2, 3, and 15 and "0" is set for the other bits in the other-terminal nonuse slot 308' ("10000000_00001111").

(Step S507)

Since the slot information notification packet 800' transmitted from the terminal J is received by the terminals I and K which can directly communicate with the terminal J, the terminals I and K extract information from the slot information notification packet 800', and update the information stored in the slot management units 1008 and the terminal information management units 1009 of the respective terminals I and K. The terminal I which performs sync communication with the terminal J using the slot 1 has already updated the information stored in the terminal information management unit 509 in step S504, it does not perform updation of information. The terminal K extracts information from the slot information notification packet 800' received from the terminal J, and displays the slot number 1 in the self-terminal use slot of the terminal J, among the slot information of all of the plural terminals managed by the terminal information management unit 1009 of the terminal K.

(Step S508 and S509)

Thereafter, assuming that the slot information notification timer 1008*a* of the terminal I has expired, the terminal I transmits the slot information notification packet 800' similar to the above-mentioned one, to the all terminals. In this case, only the terminal J which can communicate with the terminal I receives the slot information notification packet 800' from the terminal I. However, since the terminal J performs sync communication with the terminal I using the slot 1, it does not update the terminal information management unit 1009 thereof.

(Step S510~S512)

Thereafter, assuming that the slot information notification timer 1008a of a terminal that performs no sync communication, e.g., the terminal K, has expired, the terminal K transmits a slot information notification packet 800' to all terminals (terminals J and L) existing within the communication area 1507 of the terminal K. In the slot information notification packet 800' to be transmitted from the terminal K, "slot information notification packet indicating ID" is set in the packet type field 801, "broadcast terminal ID" indicating the all terminals is set in the destination terminal ID field 802, "ID of terminal K" is set in the source terminal ID field 803, "slot 5" indicating an async slot is set in the slot number field 804, "100" indicating 100 msec is set in the period field 805, "5" is set in the number-of-slots field 306, "1" is set for the bits 0, 1, 2, 3 and 15 and "0" is set for the other bits in the self-terminal nonuse slot 307' ("10000000_00001111"), and "1" is set for the bits 1, 2, 3, and 15 and "0" is set for the other bits in the other-terminal nonuse slot 308' ("10000000_00001110").

Then, between the terminals J and L that has received the slot information notification packet 800' from the terminal K, the terminal other than the terminal J using the slot 1, i.e., the terminal L, displays the slot number 1 in the other-terminal use slot of the terminal K, among the slot information of all of the plural terminals managed by the terminal information management unit 1009 thereof. Since this display indicates that another terminal other than the terminal K uses the slot 1, when there exists a terminal that starts communication with the terminal K, the terminal L can avoid at least the slot 1 and select another slot.

As described above, according to the third embodiment, the communication control apparatus 1001 included in each terminal has the slot management unit 1008 and the terminal information management unit 1009. The communication control apparatus 1001 outputs slot information including a self-terminal use slot that is used by the self-terminal and an other-terminal use slot that is used by a terminal other than the self-terminal, at an arbitrary timing that is previously set on each terminal, updates and manages the information stored in the terminal information management unit 1009 of each terminal when receiving the slot information from another terminal. Therefore, in a network wherein no control station exists, it is possible to prevent plural terminals in the network from performing data communication using the same slot, without being affected by hidden terminals, whereby time-division multiplexing connection among plural terminals can be efficiently realized.

In this third embodiment, the slots that are not used by the self and other terminals are displayed as slot information in the slot information notification packet 800', and the terminal information management unit 1009 in the communication control apparatus 1001 manages the slots that are used by the self and other terminals in each terminal. However, when the terminal information management unit 1009 manages the slots that are not used by the self and other terminals in each terminal, detection of empty slots using the information stored in the terminal information management unit is carried out as follows.

Initially, a slot that is not used by all terminals existing in positions that can be directly communicated, i.e., a slot that is commonly described in the self-terminal nonuse slots, is detected, on the basis of the slot information managed by the terminal information management unit 1009.

Next, detection of hidden terminals is carried out. If the network has not hidden terminals, a slot that is detected at this point in time is regarded as an empty slot. On the other hand, if the communication network has hidden terminals, a slot described in the other-terminal nonuse slot of the data communication response side terminal is regarded as an empty slot. When no slot is described in the other-terminal nonuse slot, it is determined that no empty slot exists.

Furthermore, a slot that is not used by all terminals existing in positions to which the data communication start side terminal can directly communicate, i.e., a common slot that is displayed in all of the self-terminal nonuse slots and the other-terminal nonuse slots, may be detected on the basis of the slot information of all of the plural terminals managed by the terminal information management unit 1009 on the data communication start side, without checking whether a hidden terminal exists or not, and the slot thus detected may be used as an empty slot. If no common slot is detected, it is determined that there is no empty slot.

The communication control method according to the second or third embodiment may be implemented by a program, or the program may be recorded in a recording medium so as to be readable by the central control unit 1004, so that the recording medium can be separated from the communication control apparatus 1001. Further, the program recorded on the recording medium may be mounted on the communication control apparatus 1001 so that the central control unit 1004 can directly read it, or the program may be read by a program reading apparatus which is connected through the interface of the communication control apparatus 1001. The recording medium may be, for example, tapes such as a magnetic tape and a cassette tape, disks including magnetic disks such as a floppy (registered trademark) disk and a hard disk, and optical disks such as a CD-ROM (Compact Disk Read Only Memory), an MO (Magneto Optical), a DVD (Digital Versatile Disk), and a CD-R (Compact Disk Recordable), cards such as an IC card and a memory card, and semiconductor memories such as a mask ROM (Read-Only Memory), an EPROM (Erasable Programmable ROM), a UV-EPROM (Ultra-Violet EPROM), an EEPROM (Electrically Erasable Programmable ROM), and a flash ROM.

Furthermore, according to the communication control method of the second or third embodiment, when sync communication is carried out at sufficiently separated positions even in the same communication network, the same slot can be used, thereby realizing effective use of slots. However, when it is determined that a slot used by the self-terminal is used by another terminal by scanning operation of each terminal or by reception of a slot information notification packet 800 or 800' distributed from the other terminal (for example, when the terminal moves), another empty slot is immediately detected to prevent the same slot from being used by plural terminals.

Furthermore, in the communication control method according to the second or third embodiment, a slot that is used by a directly communicable terminal is set in the other-terminal use slot in the slot information notification packet 800 or 800' to be notified to the neighboring terminals. However, the other-terminal use slots included in the slot information notification packets that are notified from the neighboring terminals may be added into the slot information notification packet shown in FIG. 8 as the other-terminal use slots of the other terminals. Thereby, the slot numbers being used can be notified in a broad area, whereby the possibility that the same slot is used can be reduced within an area where communication is not affected.

Furthermore, according to the communication control method, the communication control apparatus, and the communication control program of the second or third embodiment, when a part of a communication network area overlaps another communication network or when, even in a communication network wherein no hidden terminal exists due to a control station, a plurality of logical networks are constituted by introducing network IDs (for example, network IDs are given to packets, and the values are shared in the same logical network), generally each terminal is not responsible for a communication other than a communication network in which the terminal joins. However, also in this case, the communication control method, the communication control apparatus, and the communication control program according to the present invention can be employed, resulting in that band assurance communication between other communication networks can be easily realized.

APPLICABILITY IN INDUSTRY

According to the communication system, the communication control method, the communication control apparatus, and the communication control program of the present invention, throughput is ensured in a radio network wherein no control station exists or a control station does not perform access control to a communication medium, and sync communication between terminals can be reliably carried out. Therefore, they are applicable to a domestic network or an office network.

What is claimed is:

1. A communication system which performs data communication with a communication medium being shared among terminals for peer-to-peer communication, in a communication network comprising plural terminals, wherein no control station exists or, even when a control station exists, the control station does not control access to the communication medium, each of said terminals comprising:

a time sync unit for establishing time synchronization with another terminal to which the terminal communicates, using time sync information for establishing time synchronization relating to an access timing to the communication medium; and a communication monitor unit for monitoring the time sync information that is transmitted and received in communication between other terminals;

wherein the time sync information, which is obtained in the communication between other terminals by the communication monitor unit, is transmitted to a terminal different from said other terminals, in which no time synchronization has been established, wherein each terminal establishes time synchronization of the self-terminal on the basis of the time sync information obtained by the communication monitor unit, and wherein, when each terminal cannot obtain the time sync information which is exchanged in the communication between other terminals, the terminal transmits the time sync information to make a request of establishing time synchronization, when it starts transmission.

2. A communication system as defined in claim 1 wherein, when each terminal has already established time synchronization with a terminal other than the source terminal of the time sync information, upon reception of the time sync information from the source terminal, the terminal returns time sync information corresponding to the time synchronization to the source terminal of the time sync information.

3. A communication system as defined in claim 2 wherein, when each terminal receives sync time information that has been established with another terminal, as a response to the time sync establishment request, the terminal establishes time synchronization of the self-terminal according to the received sync time information.

4. A communication control method for performing data communication between arbitrary terminals using a time-division multiplexing connection method, in a communication network comprising plural terminals, wherein no control station exists or, even when a control station exists, the control station does not control access to the communication medium, during stationary operation, said method comprising:

a slot notification step of notifying slot information which represents the status of use of slots that are units of communication time, and comprises a self-terminal use slot indicating a slot that is currently used by the self-terminal and other-terminal use slots indicating slots that are used by terminals other than the self-terminal, to all of the other terminals existing in positions to which the terminal can directly communicate; and a terminal information management step of managing the slot information of all of the plural terminals including the notified slot information; and when performing data communication between arbitrary terminals, said method comprising:

an empty slot detection step of detecting an empty slot that is not being used, by using the slot information of all of the plural terminals, which information is managed in the terminal information management step of a terminal on the data communication start side; and a data communication step of performing data communication, by using an empty slot that is detected in the empty slot detection step.

5. A communication control method as defined in claim 4 wherein said empty slot detection step excludes, from all slots, the self-terminal use slots of all terminals existing in positions to which the communication start side terminal can directly communicate, which slots are managed in the terminal information management step of the data communication start side terminal, and recognizes the remaining slots as empty slots.

6. A communication control method as defined in claim 5 wherein, when it is determined that there is a hidden terminal with which the data communication start side terminal cannot directly communicate, said empty slot detection step excludes, from the remaining slots, the other-terminal use slot of the data communication response side terminal, which is managed in the terminal information management step of the communication start side terminal, and regards slots that remain at this time, as empty slots.

7. A communication control method as defined in claim 4 wherein, said empty slot detection step excludes, from all slots, the self-terminal use slots and the other-terminal use slots of all terminals existing in positions to which the communication start side terminal can directly communicate, which are managed in the terminal information management step of the data communication start side terminal, and regards the remaining slots as empty slots.

8. A communication control method as defined in claim 4 wherein said terminal information management step manages the specific IDs of the plural terminals in association with the slot information notified from the respective terminals.

9. A communication control method for performing data communication between arbitrary terminals using a time-division multiplexing connection method, in a communication network comprising plural terminals, wherein no control station exists or, even when a control station exists, it does not control access to the communication medium, during stationary operation, said method comprising:

a slot notification step of notifying slot information which represents the status of use of slots that are units of communication time, and comprises self-terminal nonuse slots indicating slots that are not currently used by a self-terminal and other-terminal nonuse slots indicating slots that are not used by terminals other than the self-terminal, to all of the other terminals existing in positions with which the terminal can directly communicate; and a terminal information management step of managing the slot information of all of the plural terminals including the notified slot information, every time the slot information is notified from the other terminal; and when performing data communication between arbitrary terminals, said method comprising:

an empty slot detection step of detecting an empty slot that is not being used, by using the slot information of all of the plural terminals, which information is managed in the terminal information management step of a terminal on the data communication start side; and a data communication step of performing data communication, by using an empty slot that is detected in the empty slot detection step.

10. A communication control method as defined in claim 9 wherein said empty slot detection step regards, as an empty slot, a common slot among the self-terminal nonuse slots of all terminals existing in positions with which the communication start side terminal can directly communicate, which slots are managed in the terminal information management step of the data communication start side terminal.

11. A communication control method as defined in claim 10 wherein, when it is determined that there is a hidden terminal with which the data communication start side terminal cannot directly communicate, said empty slot detection step regards, as an empty slot, the other-terminal nonuse slot of the data communication response side terminal, which is managed in the terminal information management step of the communication start side terminal.

12. A communication control method as defined in claim 9 wherein, said empty slot detection step regards, as an empty slot, a common slot among the self-terminal nonuse slots and the other-terminal nonuse slots of all terminals existing in positions with which the communication start side terminal can directly communicate, which are managed in the terminal information management step of the data communication start side terminal.

13. A communication control method as defined in claim 9 wherein said terminal information management step manages the specific IDs of the plural terminals in association with the slot information notified from the respective terminals.

14. A communication control apparatus of each terminal, which performs data communication using a time-division multiplexing connection method between arbitrary terminals, in a communication network comprising plural terminals, wherein no control station exists or, even when a control station exists, it does not control access to the communication medium, said apparatus comprising:

a communication control unit for notifying slot information which represents the status of use of slots that are units of communication time, and comprises a self-terminal use slot indicating a slot that is currently used by a self-terminal and other-terminal use slots indicating slots that are used by terminals other than the self-terminal, to all of the other terminals existing in positions with which the terminal can directly communicate, at an arbitrary timing, during stationary operation, and controlling the data communication to be performed between arbitrary terminals;

a terminal information management unit for managing the slot information of all of the plural terminals including the notified slot information, every time the slot information is notified from the other terminal; and an empty slot detection unit for detecting an empty slot that is not being used, by using the slot information of all of the plural terminals, which information is managed by the terminal information management unit of a terminal on the data communication start side, when performing the data communication between arbitrary terminals.

15. A communication control apparatus as defined in claim 14 wherein said empty slot detection unit excludes, from all slots, the self-terminal use slots of all terminals existing in positions to which the communication start side terminal can directly communicate, which slots are managed by the terminal information management unit of the data communication start side terminal, and recognizes the remaining slots as empty slots.

16. A communication control apparatus as defined in claim 15 wherein, when it is determined that there is a hidden terminal to which the data communication start side terminal cannot directly communicate, said empty slot detection unit excludes, from the remaining slots, the other-terminal use slot of the data communication response side terminal, which is managed in the terminal information management unit of the communication start side terminal, and regards slots that remain at this time, as empty slots.

17. A communication control apparatus as defined in claim 14 wherein, said empty slot detection unit excludes, from all slots, the self-terminal use slots and the other-terminal use slots of all terminals existing in positions to which the communication start side terminal can directly communicate, which are managed by the terminal information management unit of the data communication start side terminal, and regards the remaining slots as empty slots.

18. A communication control method as defined in claim 14 wherein said terminal information management unit manages the specific IDs of the plural terminals in association with the slot information notified from the respective terminals.

19. A communication control apparatus of each terminal, which performs data communication using a time-division multiplexing connection method between arbitrary terminals, in a communication network comprising plural terminals, wherein no control station exists or, even when a control station exists, it does not control access to the communication medium, said apparatus comprising:

a communication control unit for notifying slot information which represents the status of use of slots that are units of communication time, and comprises self-terminal nonuse slots indicating slots that are not currently used by a self-terminal and other-terminal nonuse slots indicating slots that are not used by terminals other than the self-terminal, to all of the other terminals existing in positions with which the terminal can directly communicate, at an arbitrary timing, during stationary operation, and controlling the data communication to be performed between arbitrary terminals;

a terminal information management unit for managing the slot information of all of the plural terminals including the notified slot information, every time the slot information is notified from the other terminal; and an empty slot detection unit for detecting an empty slot that is not being used, by using the slot information of all of the plural terminals, which information is managed by the terminal information management unit of a terminal on the data communication start side, when performing the data communication between arbitrary terminals.

20. A communication control apparatus as defined in claim 19 wherein said empty slot detection unit regards, as an empty slot, a common slot among the self-terminal nonuse slots of all terminals existing in positions with which the communication start side terminal can directly communicate, which slots are managed by the terminal information management unit of the data communication start side terminal.

21. A communication control apparatus as defined in claim 20 wherein, when it is determined that there is a hidden terminal with which the data communication start side terminal cannot directly communicate, said empty slot detection unit regards, as an empty slot, the other-terminal nonuse slot of the data communication response side terminal, which is managed by the terminal information management unit of the communication start side terminal.

22. A communication control apparatus as defined in claim 19 wherein, said empty slot detection unit regards, as an empty slot, a common slot among the self-terminal nonuse slots and the other-terminal nonuse slots of all terminals existing in positions with which the communication start side terminal can directly communicate, which are managed by the terminal information management unit of the data communication start side terminal.

23. A communication control method as defined in claim 19 wherein said terminal information management unit manages the specific IDs of the plural terminals in association with the slot information notified from the respective terminals.

24. A communication control program, being embodied on a computer-readable medium, and possessed by each terminal, which program makes a computer perform a communication control process of performing data communication between arbitrary terminals using a time-division multiplexing connection method, in a communication network comprising plural terminals, wherein no control station exists or, even when a control station exists, it does not control access to the communication medium, during stationary operation, said program comprising:

a slot notification step of notifying slot information which represents the status of use of slots that are units of communication time, and comprises a self-terminal use slot indicating a slot that is currently used by a self-terminal and other-terminal use slots indicating slots that are used by terminals other than the self-terminal, to all of the other terminals existing in positions with which the terminal can directly communicate; and a terminal information management step of managing the slot information of all of the plural terminals including the notified slot information, every time the slot information is notified from the other terminal; and when performing data communication between arbitrary terminals, said program comprising:

an empty slot detection step of detecting an empty slot that is not being used, by using the slot information of all of the plural terminals, which information is managed in the terminal information management step of a terminal on the data communication start side; and a data communication step of performing data communication, by using an empty slot that is detected in the empty slot detection step.

25. A communication control program, being embodied on a computer-readable medium, and possessed by each terminal, which program makes a computer perform a communication control process of performing data communication between arbitrary terminals using a time-division multiplexing connection method, in a communication network comprising plural terminals, wherein no control station exists or, even when a control station exists, it does not control access to the communication medium, during stationary operation, said program comprising:

a slot notification step of notifying slot information which represents the status of use of slots that are units of communication time, and comprises self-terminal nonuse slots indicating slots that are not currently used by a self-terminal and other-terminal nonuse slots indicating slots that are not used by terminals other than the self-terminal, to all of the other terminals existing in positions with which the terminal can directly communicate; and a terminal information management step of managing the slot information of all of the plural terminals including the notified slot information, every time the slot information is notified from the other terminal; and when performing data communication between arbitrary terminals, said program comprising:

an empty slot detection step of detecting an empty slot that is not being used, by using the slot information of all of the plural terminals, which information is managed in the terminal information management step of a terminal on the data communication start side; and a data communication step of performing data communication, by using an empty slot that is detected in the empty slot detection step.

* * * * *